(12) United States Patent
LeBlanc

(10) Patent No.: US 11,435,273 B2
(45) Date of Patent: Sep. 6, 2022

(54) DENSITOMETER WITH TENSION MEASURING DEVICE FOR INCREASED ACCURACY

(71) Applicant: Halliburton Energy Services, Inc., Houston, TX (US)

(72) Inventor: Michel Joseph LeBlanc, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 139 days.

(21) Appl. No.: 16/884,945

(22) Filed: May 27, 2020

(65) Prior Publication Data

US 2021/0372905 A1   Dec. 2, 2021

(51) Int. Cl.
*G01N 9/00* (2006.01)
*E21B 49/08* (2006.01)
*E21B 47/10* (2012.01)

(52) U.S. Cl.
CPC ............. *G01N 9/002* (2013.01); *E21B 47/10* (2013.01); *E21B 49/0875* (2020.05); *G01N 2009/004* (2013.01); *G01N 2009/006* (2013.01)

(58) Field of Classification Search
CPC ..... E21B 47/10; E21B 49/0875; G01N 9/002; G01N 2009/004; G01N 2009/005
See application file for complete search history.

(56) References Cited

U.S. PATENT DOCUMENTS

| 4,217,774 | A | 8/1980 | Agar |
| 5,351,561 | A | 10/1994 | Wenger et al. |
| 5,965,824 | A | 10/1999 | Kishiro et al. |
| 6,688,176 | B2 | 2/2004 | Storm et al. |
| 6,763,730 | B1 * | 7/2004 | Wray ............... G01F 1/849 |
| | | | 73/861.357 |

(Continued)

FOREIGN PATENT DOCUMENTS

| EP | 1744142 A1 | 1/2007 |
| JP | 06294728 A | 10/1994 |

(Continued)

OTHER PUBLICATIONS

PCT Application Serial No. PCT/US2020/035344, International Search Report, dated Feb. 24, 2021, 3 pages.
PCT Application Serial No. PCT/US2020/035344, International Written Opinion, dated Feb. 24, 2021, 5 pages.

(Continued)

*Primary Examiner* — John Fitzgerald
(74) *Attorney, Agent, or Firm* — Delizio, Peacock, Lewin & Guerra

(57) ABSTRACT

A densitometer in the present disclosure comprises tension measuring devices that send tension measurements to a measurement module enabling the measurement module to estimate fluid density with increased accuracy. The densitometer measures sample fluid density by vibrating the sample fluid and measuring the resonant frequency of the sample fluid, then estimating the sample fluid density based on this resonant frequency. A set of tension measuring devices affixed to a tube of the densitometer measure external forces on the tube due to O-ring seals and other operational conditions. The sample fluid density estimate uses these tension measurements to take into account O-ring friction and other external forces applied to the densitometer to improve the accuracy of the calculated density.

20 Claims, 19 Drawing Sheets

(56) References Cited

U.S. PATENT DOCUMENTS

| | | | |
|---|---|---|---|
| 9,008,977 B2* | 4/2015 | Gao | G01H 3/00 |
| | | | 702/50 |
| 2011/0167910 A1* | 7/2011 | Storm | G01F 1/8495 |
| | | | 73/152.58 |
| 2013/0255399 A1 | 10/2013 | Tombs | |
| 2015/0070000 A1 | 3/2015 | Gao et al. | |
| 2021/0372904 A1 | 12/2021 | LeBlanc et al. | |
| 2021/0372906 A1 | 12/2021 | LeBlanc et al. | |

FOREIGN PATENT DOCUMENTS

| | | | |
|---|---|---|---|
| JP | 0712612 | A | 1/1995 |
| JP | 2005106573 | A | 4/2005 |
| WO | 1995029385 | A1 | 11/1995 |
| WO | 2010033532 | A1 | 3/2010 |
| WO | 2014088577 | A1 | 6/2014 |
| WO | 2021242260 | A9 | 12/2021 |
| WO | 2021242262 | A9 | 12/2021 |
| WO | 2021242264 | A9 | 12/2021 |

OTHER PUBLICATIONS

PCT Application Serial No. PCT/US2020/035355, International Search Report, dated Feb. 24, 2021, 4 pages.

PCT Application Serial No. PCT/US2020/035355, International Written Opinion, dated Feb. 24, 2021, 5 pages.

PCT Application Serial No. PCT/US2020/035362 International Search Report, dated Feb. 24, 2021, 3 pages.

PCT Application Serial No. PCT/US2020/035362 International Written Opinion, dated Feb. 24, 2021, 5 pages.

Gao, et al., "Improved Accuracy in the Measurement of Downhole In-Situ Fluid Density", Society of Petroleum Engineers, Annual Technical Conference & Exhibition, Oct. 2009, 21 pages.

Gao, et al., "Sensitivity of a High-Resolution Fluid-Density Sensor in Multiphase Flow", Society of Petroleum Engineers, Annual Technical Conference & Exhibition, Sep. 2010, 19 pages.

"U.S. Appl. No. 16/885,167, Final Office Action", dated Jun. 9, 2022, 13 pages.

"U.S. Appl. No. 16/885,167, Non-Final Office Action", dated Apr. 28, 2022, 11 pages.

* cited by examiner

DENSITOMETER WITH TENSION MEASURING DEVICE FOR INCREASED ACCURACY

BACKGROUND

The disclosure generally relates to the field of logging while drilling (LWD), and to pumpout wireline formation testing.

In wireline and LWD operations, accurate fluid density measurements are important for formation sampling and fluid identification. An in-line densitometer can be deployed in a pumpout wireline formation tester (PWFT) for fluid density measurements. Using an in-line densitometer to measure fluid density is sensitive to changes in temperature and pressure downhole, as accuracy of the measurement by the in-line densitometer relies on a characterization of the mechanical response of the densitometer under varying operating conditions including temperature, pressure, external forces, etc.

BRIEF DESCRIPTION OF THE DRAWINGS

Aspects of the disclosure may be better understood by referencing the accompanying drawings.

DESCRIPTION

Figure 1:
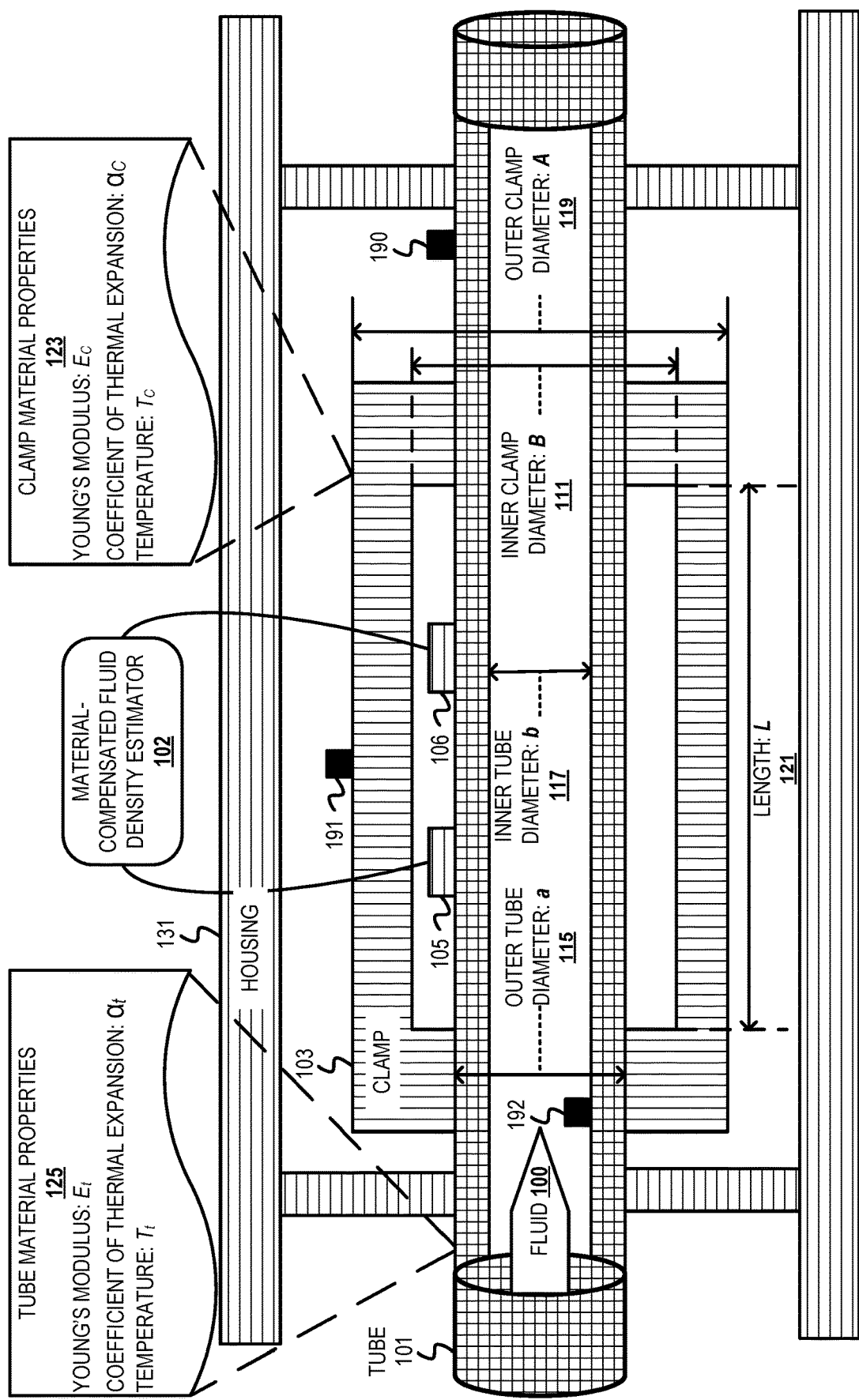
FIG. 1 is a schematic diagram of a densitometer with dissimilar tube and clamp materials.

The description that follows includes example systems, methods, techniques, and program flows that embody aspects of the disclosure. However, it is understood that this disclosure may be practiced without these specific details. For instance, this disclosure refers to wireline formation testing in illustrative examples. Aspects of this disclosure can be instead applied to production or injection well testing. In other instances, well-known instruction instances, protocols, structures and techniques have not been shown in detail in order not to obfuscate the description.

Overview

A single-tube densitometer measure fluid density using a vibration source that drives a sample fluid cavity to resonance and measures a resonant frequency of the sample fluid. The fluid density measurement is recovered as a function of the measured resonant frequency of the sample fluid. The densitometer receives fluid in stream during LWD operations, or wireline pumpout operations, via a tube which redirects all or some of the fluid into a vibrating tube section supported at each end by a rigid body (clamp). The resonant frequency of the tube section between the two clamp ends and containing the fluid sample is a function of both the actual fluid density in the tube, as well as several other physical characteristics of the densitometer and its environment, such as the temperatures of the clamp and tube, the coefficients of thermal expansion (CTE) of the clamp and tube, the axial pre-tension force retained in the tube between the clamps, any external force exerted on the tube outside of the clamp, the Young's moduli of the tube and clamp, the inner and outer diameter of the tube, the inner and outer diameter of the clamp segment between the clamp ends, the density of the tube material, the length of the tube segment between the clamp ends, the pressure of the fluid, etc. Errors in the fluid density measurement come from measurement errors of various sensors deployed throughout the densitometer and also depend on an accurate theoretical characterization of the resonant frequency with respect to various sensor measurements (e.g. the fluid pressure and temperature, the tube and clamp temperatures). A measurement module that determines the resonant frequency as a function of these sensor measurements is calibrated based on this theoretical characterization as well as predetermined system dependencies on pressure, temperature, etc. Thus, errors in the fluid density measurement come from measurement errors of various sensors deployed throughout the densitometer or if the theoretical characterization of the resonant frequency with respect to the various sensor measurements is inaccurate.

Accuracy in fluid density measurement is influenced by accurate calibration of a measurement module for a single-tube densitometer. To increase accuracy in calibration and correspondingly fluid density measurement, the single-tube densitometer is designed to reduce the temperature sensitivity of the densitometer. Using materials with dissimilar coefficient of thermal expansions for the tube and clamp reduces temperature sensitivity. Moreover, using dissimilar clamp and tube materials allows for cost effective design considerations. An accurate theoretical characterization of the densitometer should account for clamp material and tube material with different CTEs. With the reduced temperature sensitivity facilitated by the clamp and tube materials with different CTEs, the measurement module is more accurately calibrated due to reduced accumulation of errors from temperature changes and inaccurate temperature measurements, and the clamp material and tube material can be chosen as a cost-efficient metallic alloy. The measured resonant frequency and fluid density derived thereof achieve greater accuracy when compared to a densitometer with identical tube material and clamp material.

To accurately calibrate the measurement module (and, therefore, accurately measure the fluid density), it is additionally desirable to reduce the dependency of the resonant frequency on the fluid pressure. Another improvement described in this disclosure targets the reduction of the pressure sensitivity of the densitometer. This is accomplished by changing the hydraulic configuration of the fluid flow within the densitometer to use fluid pressure to convey axial tension on the tube. The effect of the added axial tension caused by pressure on the tube resonant frequency is equal and opposite to the usual effect due to pressure and this added axial tension reduces or eliminates the effect of fluid pressure on the measured resonance frequency. This, in turn, reduces or eliminates the effect of pressure on the estimated density of the sample fluid by the measurement module.

It is found in practice with real densitometers that some external forces applied to the tube are unpredictable. Those include the frictional forces due to O-rings present in the densitometer assembly. These O-rings are needed as seals between the densitometer tube and the other tool components in which the densitometer is mounted. The magnitude and direction of O-ring friction between the tube and the structural parts holding the densitometer to the tool are, in general, indeterminate and this adds an unknown error to the estimated density of the sample fluid. Another improvement described in this disclosure is the addition and use of tension measuring devices situated on the tube measure the axial tensile or compressive force the tube experiences during operational conditions. The measurement module is calibrated to use these measurements to provide a more accurate estimation of sample fluid density.

Example Densitometer with Minimized Temperature Dependence

FIG. 1 is a schematic diagram of a densitometer with dissimilar tube and clamp materials. A fluid 100 enters the densitometer through a tube 101 and flows horizontally from left to right. A clamp 103 is attached to the tube 101 and is contained in a housing 131 that shields the tube 101 and the clamp 103 from external environmental factors such as forces, external fluids and pressure. A vibration source 105 and a vibration detector 106 are affixed to the tube 101. Typically, the vibration source 105 and the vibration detector 106 are magnets whose motion are actuated or detected by electromagnetic coils placed in the clamp (not pictured). A material-compensated fluid density estimator 102 is communicatively coupled to the vibration source 105 and the vibration detector 106 as well as various pressure, temperature, strain and force sensors throughout the densitometer 190-192. Although depicted as 3 sensors, more or less than 3 sensors can be implemented at various locations throughout the densitometer. The tube 101 has an inner diameter b 117, an outer diameter a 115, and an inner tube section inside the clamp of length L 121. The clamp 103 has an inner diameter B 111 and an outer diameter A 119. The clamp 103 and the tube 101 are made of different materials as indicated by different fill patterns in FIG. 1. The housing 131 can be made of material that is different than both the clamp 103 and the tube 101 or made of the same materials as one of the tube 101 and the clamp 103. The tube 101 is made of a material having Young's modulus $E_c$, coefficient of thermal expansion (CTE) $\alpha_c$, and temperature $T_c$ as indicated by material properties 123. The clamp 103 is made of a material having Young's modulus $E_t$, CTE $\alpha_t$, and temperature $T_t$ as indicated by material properties 125. Typical dimensions are b=0.219", a=0.301", L=6", B=0.6", A=1.8", total tube length 15" (including sections outside the clamps) and clamp length 9" (clamp length not pictured). The section of tube of length L contained within the clamp is typically given pre-tension, held by the clamp. A typical pre-tension value is +700 pound-force (lbf). However, the densitometer may also be operated with the tube free of tension, or in compression (negative force value).

The vibration source 105 can comprise a magnet affixed to the outer section of the tube 101 and one or more electromagnetic coils affixed to the inner section of the clamp 103. The material-compensated fluid density estimator 102 can drive an alternating current through the electromagnetic coils which produces an oscillating force on the magnet affixed to the tube 101, vibrating the section of tube 101 of length L between the clamp ends. The vibration detector 106 can also comprise a magnet affixed to the tube 101 and one or more electromagnetic coils affixed to the inner section of the clamp 103. Vibrations in the tube 101 cause the magnet in the vibration detector 106 to vibrate (vertically, in the plane of FIG. 1) which induces an alternating current in the electromagnetic coils in the vibration detector 106. The vibration detector 106 sends current induced by the varying magnetic field to the material-compensated fluid density estimator 102 which can measure the current and infer a measured resonant frequency of the fluid 100 inside the tube 101. Although depicted on the same side of the tube 101, the vibration source 105 and the vibration detector 106 can be affixed to opposite sides of the tube 101. The position of the vibration source 105 and the vibration detector 106 is designed to maximize the effectiveness of vibrations in the tube 101 induced by the vibration source 105 and to minimize interference of magnetic fields created by the vibration source 105 on vibration detector 106. Other configurations of magnets and electromagnetic coils can be implemented and other types of vibration sources and vibration detectors can be used that induce a vibration in the tube 101 and accurately measure the resonant frequency of the vibration. For example, vibration source 105 and vibration detector 106 can be part of a resonant electrical circuit designed to maintain the vibrating tube section at resonance. In another embodiment, an optical fiber sensor is bonded to the tube and interrogated for dynamic strain.

A partial differential equation (PDE) can be derived for the densitometer in FIG. 1 using first principles that describes the transverse displacement of the tube 101, t), at position x and time t as a result of the vibration:

$$E_t I \frac{\partial^4 \psi}{\partial z^4} + (m_f V^2 - F_t + P \cdot S_f) \frac{\partial^2 \psi}{\partial z^2} + \qquad (1)$$
$$2 m_f V \frac{\partial^2 \psi}{\partial r \partial z} + [(m_t + m_f) + M_1 \delta(z - z_1) + M_2 \delta(z - z_2)] \frac{\partial^2 \psi}{\partial r^2} = 0$$

Here, $$I = \frac{\pi}{64}(a^4 - b^4)$$

is the area moment of inertia of the tube 101, $$S_f = \frac{\pi}{4}b^2$$

is the cross-sectional area of the fluid 100 inside the tube 101, $m_f = \rho_f S_f$ is the linear density (mass per unit length) of the fluid 100 inside the tube 101 (where $\rho_f$ is the fluid density of the fluid 100), $F_t$ is the horizontal axial force acting on the tube 101 (in the vibrating section of length L), V is the average velocity of the fluid 100 inside the tube 101, P is the pressure of the fluid 100 inside the tube 101, $m_t$ is the linear density of the tube 101, $M_1$ is the mass of a source magnet which is at position $z_1$, $M_2$ is the mass of the detector magnet which is at position $z_2$, and $\delta(z)$ is the Dirac delta function. By neglecting the $m_f V^2$ term in (1) (with the reasoning that removing this term will have a negligible effect on the solution of the PDE), (1) can be solved analytically, and the solution $\psi$ will be periodic with time. The fundamental resonant frequency of the vibration can be derived by solving for the period of the solution $\psi$ in the t (time) variable. The resulting resonant frequency is:

$$f_0 = \frac{\beta_0^2}{2\pi L^2}\sqrt{\frac{E_t I}{m_t + \rho_f S_f}} \quad (2)$$

Here, $\beta_0 = \beta_0(\rho_f, T_t, T_h, P, E_t, 1, M_1, M_2, m_t, a, b, A, B, z_1, z_2, F_t)$ is a function on all of the physical parameters of the densitometer, where $T_t$ is the temperature in the tube 101 and $T_h$ is the temperature in the housing 131. Further, certain of these parameters are dependent on the pressure and temperature of various components of the densitometer. For example, $a = a(T_t, P)$ and $b = b(T_t, P)$ are both dependent on the temperature and pressure in the tube 101 and $E_t = E_t(T_t)$ is a function of the temperature of the tube 101. The material-compensated fluid density estimator 102, when deriving the resonant frequency of the fluid 100 using equation (2), can be calibrated to tune parameters that are dependent on pressure/temperature using pressure and temperature measurements throughout the densitometer and known (possibly pre-calibrated) dependence of these parameters.

To compensate for the use of different materials in the tube 101 and the clamp 103, the length, inner diameter, outer diameter, and force acting on the tube 101 can be approximated using physical properties of the tube 101 and clamp 103 materials. In the below equations (again derived from first principles of the densitometer system), it is assumed that a tension $F_{t_0}$ was applied at the ends of the tube 101 prior to tightening the clamp 103 and that this occurred while the tube 101 and the clamp 103 were both at a reference temperature $T_{ref}$ (e.g., room temperature). $L_0$, $a_0$, $b_0$ are the original values for L, a, b used in equation (1) at $T_t = T_{ref}$, $v_t$ is Poisson's ratio for the material of the tube 101, $F_A$ is any external axial forces on the tube 101, $$S_c = \frac{\pi}{4}(A^2 - B^2)$$

is the cross-sectional area of the clamp 103, and $$S_t = \frac{\pi}{4}(a^2 - b^2)$$

is the cross-sectional area of the tube 101. Using all of these parameters, $F_t$, L, a, and b can be computed in equation (2) using the following formulae:

$$F_t = \frac{E_c S_c}{E_c S_c + E_t S_t}\left[\left(F_{t_0} + \frac{\pi P v_t b^2}{2}\right) + E_t S_t(\alpha_c(T_c - T_{ref}) - \alpha_t(T_t - T_{ref}))\right] + \frac{E_t S_t F_A}{E_c S_c + E_t S_t} \quad (3)$$

$$L = L_0\left[1 - \frac{\pi P v_t b_0^2}{2 E_t S_t} + \alpha_t(T_t - T_{ref}) + \frac{F_t}{E_t S_t}\right] \quad (4)$$

$$a = a_0\left[1 + \frac{\pi P b_0^2}{2 E_t S_t} + \alpha_t(T_t - T_{ref}) - \frac{F_t v_t}{E_t S_t}\right] \quad (5)$$

$$b = b_0\left[1 + \frac{P}{E_t}\left(\frac{\pi(a_0^2 + b_0^2)}{4 S_t} + v_t\right) + \alpha_t(T_t - T_{ref}) - \frac{F_t v_t}{E_t S_t}\right] \quad (6)$$

The $$\frac{E_c S_c}{E_c S_c + E_t S_t}$$

factor in equation (3) compensates forces on the tube 101 for compliance of the clamp 103. For instance, for pre-tensioning the tube, an axial force $F_{t_0}$ is applied before the clamps are tightened. Once the clamp is tightened, the tension is released for the tube section outside the clamp. However, for the section of the tube 101 inside the clamp 103, the contribution to force $F_t$ of this pre-tension is reduced due to the fact that the clamp 103 is made with a material of finite Young's modulus. If, after the initial release of tension, a new force $F_A$ (tensile or compressive) is applied on the section of the tube 101 outside of the clamp 103, this new force will affect the tension remaining in the tube in the section inside the clamp 103. However, the effect of the external force is going to be much smaller in the section of tube 101 inside the clamp 103. The reduction factor is $$\frac{E_t S_t}{E_c S_c + E_t S_t}.$$

This factor is typically of the order of 0.05.

Using the values given in equations (3), (4), (5), and (6) in equation (2), the material-compensated fluid density estimator 102 can solve for the resonant frequency of the tube for a given fluid 100 when the tube 101 and clamp 103 are made of different materials, and also compensate for temperature/pressure dependency of various parameters throughout equations (2), (3), (4), (5), and (6). Moreover, the density $\rho_f$ of the fluid 100 can be solved algebraically from equation (2) using the derived resonant frequency.

Although hidden by the catch-all term $\beta_0$ in equation (2), the resonant frequency of the fluid 100 depends on the axial force along the tube 101 $F_t$ such that an increased axial force causes a higher resonance frequency. Moreover, from equation (3) it is clear that the axial force $F_t$ is itself dependent on uniform temperature change in both tube 101 and clamp 103 temperature $T_t$, and $T_c$ respectively. This can be characterized by $$\frac{\Delta F_t}{\Delta T} = \frac{E_c S_c E_t S_t}{E_c S_c + E_t S_t}(\alpha_c - \alpha_t) \qquad (7)$$

From equation (7), if the tube 101 and clamp 103 are made from the same material ($\alpha_c = \alpha_T$), the temperature dependence of the axial force on the tube vanishes. However, it is often cost-effective due to the design of the tube 101 and the clamp 103 to use dissimilar materials. For example, it may be cost-effective to use Titanium Ti-6Al-4V Grade 5 Alloy for the material of the tube 101 and INCONEL® 706 Precipitation Hardening Alloy for the material of the clamp 103. The materials for the tube 101 and the clamp 103 can be chosen using equation (7) such that $$\frac{\Delta F_t}{\Delta T}$$

compensates for shift of the resonant frequency with a temperature change ΔT uniform over both the clamp and the tube. This will have the effect of minimizing the dependence on uniform temperature changes of the resonant frequency and resultant fluid density derived from equation (2). In some embodiments, the axial load on the tube 101 using materials with CTE prescribed by equation (7) will be beyond the threshold axial force limits of the components of the densitometer. For example, using the above titanium-alloy tube and clamp may only be able to handle 25 kilopounds per square inch (ksi) whereas using H.C. Starck® MP35N Nickel/Cobalt/Chromium/Molybdenum and the above combination of MP35N alloy and INCONEL alloy may only be able to handle 30 ksi. These choices of materials reduces the temperature dependence of the resonant frequency of the tube 101 instead of completely cancelling it out. Choosing materials with CTEs that completely cancel dependence may exceed acceptable load thresholds (measured in ksi above) on the tube 101 and clamp 103.

Because of the limited choice of specific coefficient of thermal expansion values for materials practical to use for the tube 101 and clamp 103 in a downhole densitometer, the full cancellation of the temperature dependence may not be possible with the choice of a single pair of materials. Instead, the tube 101 and/or clamp 103 can be made of a composite of cost-effective materials having various CTE values in order to achieve a desired CTE. For example, the clamp 103 can comprise multiple layers of a low CTE material (e.g., a graphite/epoxy composite) and layers of a high CTE material (e.g., thin aluminum layers). Other layer/material combinations are possible. Given a tube 101 and/or clamp 103 comprising N layers, where the ith layer has a CTE of $\alpha_i$, Young's modulus $E_i$, and cross-sectional area $S_i$, the effective CTE of the layered materials is given by $$\alpha_{c,eff} = \frac{\sum_{i=1}^{N} \alpha_i E_i S_i}{\sum_{i=1}^{N} E_i S_i}$$

and this value can be used in all of the equations (2), (3), (4), (5), (6), and (7) for $\alpha_c$.

Example Densitometer with Tension Measuring Devices

While desirable for the external axial force $F_A$ to be zero to have no influence on the densitometer response, the connections of the tube in a typical tool with the other sections of the wireline tool or the LWD tool will be such that this term will depend on the fluid pressure. For example, the tube end can be connected to a manifold assembly (not pictured) with O-rings providing a seal between the tube 101 and the manifold. An increase of fluid pressure would then cause an increase of the axial compressive force acting at the tube end. Whereas the contribution of fluid pressure on $F_A$ can be calculated given a measurement of the fluid pressure, the frictional force due to the sliding of the O-rings relative to the tube receptacle is typically unknown. This is because friction depends on the load history. In particular, friction reverses direction when the relative displacement between the parts reverses direction and causes hysteresis. We describe here how calibration and operation of the densitometer can utilize tension measuring devices attached to at least one of the tube and the clamp to account for the $F_A$ term, including the frictional effects that would otherwise not be quantifiable.

Figure 2:
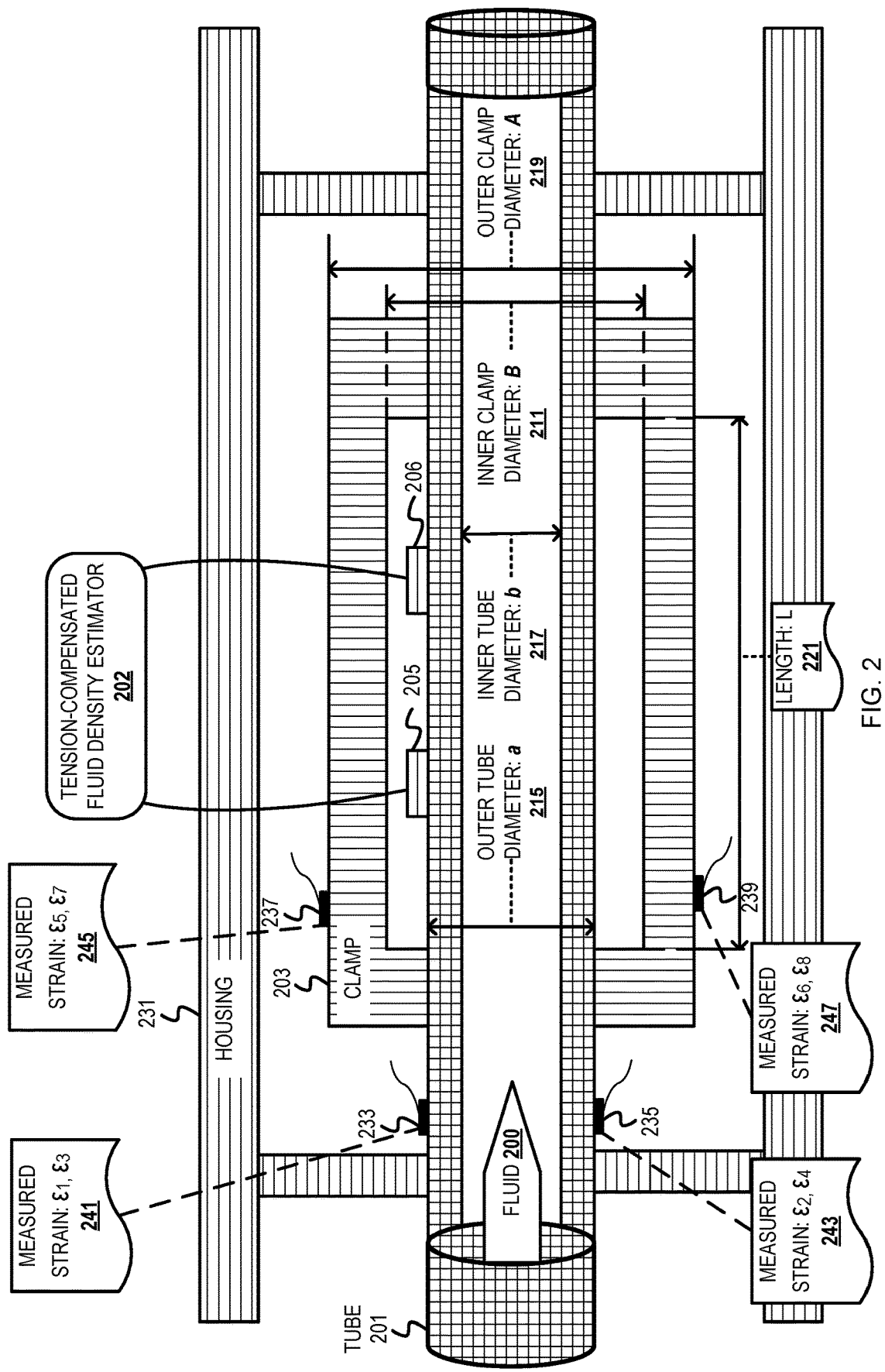
FIG. 2 is a schematic diagram of a densitometer with tension measuring devices.

FIG. 2 is a schematic diagram of a densitometer with tension measuring devices. The role of the tension measuring devices is to provide measurements from which the axial force applied to the tube outside of the clamp can be derived. With a direct measurement of this force, the role played by the mounting hardware, friction from O-rings, the effect of fluid pressure on the tube end, etc., can be taken into account in the calculation of density, therefore providing a better estimate of density. Referring to FIG. 2, fluid 200 enters the densitometer through a tube 201 and flows horizontally from left to right. A clamp 203 is attached to the tube 201 and is contained in a housing 231 that shields the tube 201 and the clamp 203 from external environmental factors such as forces, external fluids, pressure, etc. Tension measuring devices 233 and 235 adhere to opposite sides of the tube 201 and measure strains $\varepsilon_1$, $\varepsilon_3$ 241 and $\varepsilon_2$, $\varepsilon_4$ 243, respectively. Tension measuring devices 237 and 239 adhere to opposite sides of the clamp 203 and measure strains $\varepsilon_5$, $\varepsilon_7$ 245 and $\varepsilon_6$, $\varepsilon_8$ 247, respectively. A vibration source 205 and a vibration detector 206 are affixed to the tube 201. A tension-compensated fluid density estimator 202 is communicatively coupled to the vibration source 205, the vibration detector 206, the tension measuring devices 233, 235, 237 and 239, as well as various pressure, and temperature, strain and force sensors throughout the densitometer (not pictured). The tube 201 has an inner diameter b 217, an outer diameter a 215, and an inner tube section length L 221, and the clamp has an inner diameter B 211, an outer diameter A 219. The housing 231, the clamp 203, and the tube 201 can have different materials as indicated by different fill patterns in FIG. 2. The tension-compensated fluid density estimator 202 can be configured to compensate for different materials of the tube 201 as described variously with reference to FIG. 1. Although in this description we refer to strain gauges mounted on the tube, strain gauges mounted on the clamp, and other force measurement devices such as load cells which can be mounted at different locations along the densitometer can also be used. Not all of them are needed to determine the axial force. For example, strain gauges mounted on the tube only may be sufficient. Alternatively, strain gauges mounted on the clamp only may be sufficient. However, strain changes due to external force on the tube are much smaller on the clamp compared to the tube so the accuracy and precision of the force determination will be poorer using strain gauges on the clamp compared to using strain gauges on the tube.

The tension measuring devices 233, 235, 237, and 239 can be sets of strain gauges or any other device configured to measure strain on the tube 201 and the clamp 203. The measured strains 241, 243, 245, and 247 comprise multiple measurements for each tension measuring device. In some embodiments, a single strain can be measured at each tension measuring device. The tension measuring devices 233, 235, 237, and 239 are depicted as measuring two strains which can correspond to one strain gauge aligned parallel to the axis of the tube 201 and one strain gauge aligned perpendicular to the axis of the tube 201. Such a configuration can accurately measure axial strain along the tube 201 and is depicted with reference to FIG. 5. For this embodiment, where $\varepsilon_1$ and $\varepsilon_2$ are measured by strain gauges arranged parallel to the axis of the tube 201 and $\varepsilon_3$ and $\varepsilon_4$ are measured by strain gauges arranged perpendicular to the axis of the tube 201. These strains are responsive to axial tension on the tube, as well as to the pressure of the fluid inside the tube. To estimate the axial tension, while minimizing the effect of temperature on the strain gauges on the tube are connected in a Wheatstone bridge configuration that outputs the following "bridge output" strain:

$$\varepsilon_B = \tfrac{1}{4}(\varepsilon_1 - \varepsilon_2 + \varepsilon_3 - \varepsilon_4) \tag{8}$$

where the $\varepsilon_i$ values, with i=1, 2, 3 or 4, designate ratios of resistance change to original resistance values (i.e., $\Delta R_i/R_i$).

In order to accurately calibrate the densitometer in FIG. 2 when deriving the resonant frequency from equation (2), the external force $F_A$ on the tube 201 appearing in equation (3) needs to be accurately determined. The measured strain $\varepsilon_B$ from equation (8) can be used to accurately determine any external forces acting on the tube 201. In the following derivations, the measured strains $\varepsilon_1$ and $\varepsilon_3$ are assumed to be equal and the measured strains $\varepsilon_2$ and $\varepsilon_4$, for the purposes of extracting an analytical formula for the external force $F_A$ as a function of $\varepsilon_T$. These measured strains may not be equal in practice, due to bending, whence equation (8) uses averages. Using standard strain gauge formulae, $$\varepsilon_1 = \frac{\Delta R_1}{R_1} = \varepsilon_3 = \frac{\Delta R_3}{R_3} = K_1(\varepsilon_z - \alpha_g \Delta T) + K_2(\varepsilon_\theta - \alpha_g \Delta T) + K_3 \Delta T \tag{9}$$

$$\varepsilon_2 = \frac{\Delta R_2}{R_2} = \varepsilon_4 = \frac{\Delta R_4}{R_4} = K_1(\varepsilon_\theta - \alpha_g \Delta T) + K_2(\varepsilon_z - \alpha_g \Delta T) + K_3 \Delta T \tag{10}$$

where $\varepsilon_z$ is the strain on the tube 101 in the axial direction, $\varepsilon_\theta$ is the strain on the tube 101 in the perpendicular direction (i.e. the direction of the strain gauges perpendicular to the tube 101), $\alpha_g$ is the CTE of the strain gauge material, $\Delta T$ is a uniform temperature change across the tube 201 and the clamp 203, and $K_1$, $K_2$, and $K_3$ are determined using parameters provided by the strain gauge manufacturer. Specifically, where the strain gauge manufacturer provides a gauge factor G, a transverse sensitivity factor $K_t$, and a Poisson ratio of a reference sample $v_0$, then $$K_1 = \frac{G}{1 - v_0 K_t},$$

and $K_2 = K_t K_1$ ($K_3$ does not need to be calculated as in cancels out in later computations). The terms $\varepsilon_z$ and $\varepsilon_\theta$ can be expressed as a function of $F_A$ (which will enable solving for $F_A$ as a function of $\varepsilon_T$) by decomposition into their pressure, force, and temperature dependencies:

$$\varepsilon_z = \varepsilon_z^P + \varepsilon_z^{F_A} + \varepsilon_z^{\Delta T} = \frac{-2Pv_tb^2}{E_t(a^2 - b^2)} + \frac{F_A}{E_t \frac{\pi}{4}(a^2 - b^2)} + \alpha_T \Delta T \tag{11}$$

$$\varepsilon_\theta = \varepsilon_\theta^P + \varepsilon_\theta^{F_A} + \varepsilon_\theta^{\Delta T} = \frac{2Pb^2}{E_t(a^2 - b^2)} + \frac{-v_t F_A}{E_t \frac{\pi}{4}(a^2 - b^2)} + \alpha_T \Delta T \tag{12}$$

plugging (11) and (12) into (9) and (10) and solving for $\varepsilon_B$ using equation (8), $$\varepsilon_B = \frac{(K_1 - K_2)(1 - v_t)}{E_t(a^2 - b^2)}\left[Pb^2 + \frac{2}{\pi}F_A\right] \tag{13}$$

Solving for $F_A$, we get:

$$F_A = \left(\frac{\varepsilon_B E_t(a^2 - b^2)}{(K_1 - K_2)(1 - v_t)} - Pb^2\right)\frac{\pi}{2} \tag{14}$$

The tension-compensated fluid density estimator 202 is configured to compute $F_A$ using equation (13) with the corresponding measurements and strain gauge parameters, and to use this value in equation (3) when computing the resonant frequency via equation (2).

Although depicted outside of the clamp 203, the tube-mounted tension measuring devices 233 and 235 can be situated inside the clamp 203. In this case, the tube tension $F_t$ can be obtained directly from the bridge output as follows:

$$F_t = \left(\frac{\varepsilon_B E_t(a^2 - b^2)}{(K_1 - K_2)(1 - v_t)} - Pb^2\right)\frac{\pi}{2} \tag{15}$$

If the four strain gauges are mounted on the clamp, then $$\varepsilon_1 = \frac{\Delta R_1}{R_1} = \varepsilon_3 = \frac{\Delta R_3}{R_3} = K_1(\varepsilon_{z,c} - \alpha_g \Delta T) + K_2(\varepsilon_{\theta,c} - \alpha_g \Delta T) + K_3 \Delta T \tag{16}$$

$$\varepsilon_2 = \frac{\Delta R_2}{R_2} = \varepsilon_4 = \frac{\Delta R_4}{R_4} = K_1(\varepsilon_{\theta,c} - \alpha_g \Delta T) + K_2(\varepsilon_{z,c} - \alpha_g \Delta T) + K_3 \Delta T \tag{17}$$

$$\varepsilon_{z,c} = \frac{F_A}{E_t S_t + E_c S_c} + \alpha_c \Delta T \tag{18}$$

$$\varepsilon_{\theta,c} = -v_c \frac{F_A}{E_t S_t + E_c S_c} + \alpha_c \Delta T \tag{19}$$

$$\varepsilon_B = \frac{(K_1 - K_2)}{2}(\varepsilon_{z,c} - \varepsilon_{\theta,c}) = \tag{20}$$

$$\frac{(K_1 - K_2)(1 + v_c)}{2} \frac{F_A}{E_t S_t + E_c S_c} = \frac{(G)(1 - K_T)(1 + v_c)}{2(1 - v_0 K_T)} \frac{F_A}{E_t S_t + E_c S_c}$$

The force is obtained from:

$$F_A = \frac{2\varepsilon_B(E_t s_t + E_c s_c)}{(K_1 - K_2)(1 + v_t)} = \frac{2\varepsilon_B(1 - v_0 K_T)(E_t s_t + E_c S_c)}{G(1 - K_T)(1 + v_t)} \tag{21}$$

Example Densitometer with Minimized Pressure Dependence

As discussed above, fluid pressure directly affects the resonance frequency of the densitometer and this effect is separate from the change of density of the fluid that occurs due to the compressibility of the fluid. All fluids are compressible to some extent and therefore will change density with changes in pressure. The effects being considered for increased accuracy of the densitometer are the effects on the resonance frequency of the pressure itself, separate from the change of density. Equation 1 indicates that pressure should have an individual impact on the densitometer response, separate from the fluid density $\rho_f$. In addition, pressure will have an effect on the dimensions of the tube, and on the axial force $F_t$ in the tube, as made clear in Equations 3 to 6. Calibration of the densitometer can make use of the effect of fluid pressure on the tube section outside of the clamp to tailor the response of the densitometer to changes in fluid pressure. This reduces or eliminates the intrinsic sensitivity to pressure of the densitometer, allowing for increased accuracy of measurements by the densitometer.

Figure 3:
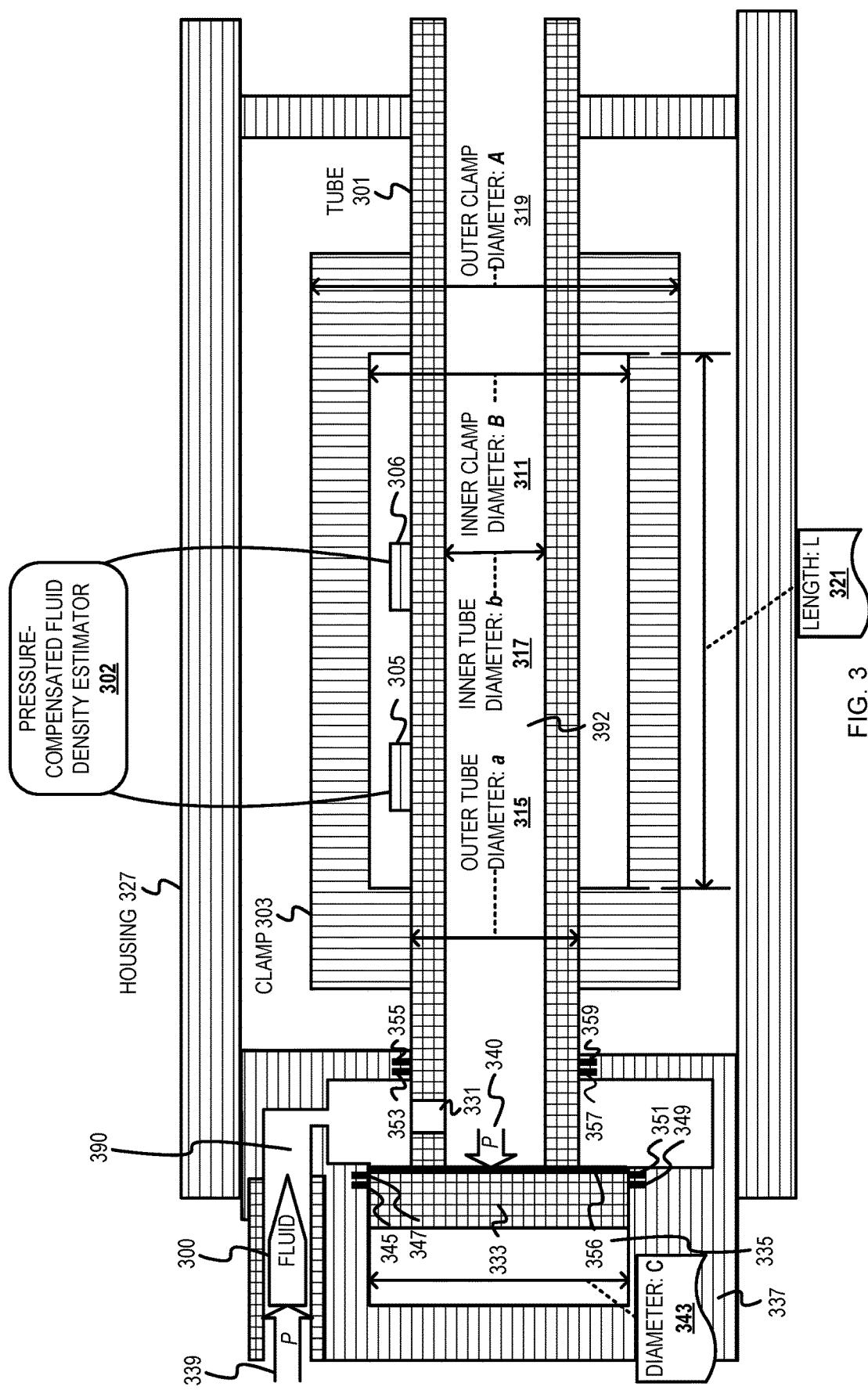
FIG. 3 is a schematic diagram of a densitometer with decreased pressure dependence.

FIG. 3 is a schematic diagram of a densitometer with decreased pressure dependence. Fluid 300 enters the densitometer through a tube 301 and follows a flow path from left to right. A clamp 303 is attached to the tube 301 and is contained in a housing 327 that shields the tube 301 and the clamp 303 from external environmental factors such as forces, external fluids, pressure, etc. A vibration source 305 and a vibration detector 306 are affixed to the tube 301. A pressure-compensated fluid density estimator 302 is communicatively coupled to the vibration source 305, the vibration detector 306, as well as various pressure, temperature, strain and force sensors throughout the densitometer (not pictured). The tube 301 has an inner diameter b 317, an outer diameter a 315, and an inner tube section length L 321. The clamp has an inner diameter B 311 and an outer diameter A 319. The densitometer further comprises a first manifold inflow section 390 where the fluid 300 originates at pressure P 340, and a tube section 392 where the fluid undergoes vibrations. The fluid 300 flows into the tube via port 331. The fluid 300 exerts pressure 340 on an annular surface 356 of a piston 333 having a diameter c 343 as well as the tube end disk, which is part of the same piston, as indicated by the three arrows with label "P" in FIG. 3. The piston 333 is sealed to manifold 337 via O-rings 345/349 (these two numbers refer to the same O-ring on opposite side of the tube in the cross-sectional drawing) and 347/351 (also a single O-ring). The manifold 337 is also sealed to the tube 301 via the pair of O-rings 353/357 and, 355/359. Although 4 total O-rings are depicted, the number of O-rings can vary. A fluid chamber 335 situated behind the piston 333 collects possible fluid leakage from the seal with the O-rings 345, 347, 349, and 351. The housing 327, the clamp 303, and the tube 301 can have different materials as indicated by different fill patterns in FIG. 3 and the pressure-compensated fluid density estimator 302 can be configured to also compensate for the thermal response due to different materials as described variously with reference to FIG. 1.

The dimension of the outer diameter of piston 333 relative to other dimensions (including the diameter at O-rings 353/357 and 355/359) is adjusted during the design of the densitometer in FIG. 3 such that the resonant frequency of the vibrating section 392 of the tube 301 of length L 321 has a minimized dependence on the pressure P. The key adjustment desired is the amount of tension applied to the tube 301 in response to the applied pressure. In some embodiments, one of the sets of O rings (either the ones of piston 333, one the opposite ones shown as 353/357 and 355/359, can be replaced with a flexible disk or membrane that allows the relative displacement of the tube relative to the manifold 337 with applied pressure. Using a flexible disk or membrane eliminates the frictional force due to O-rings. Although embodiments can use both an O-ring and a flexible disk/membrane in different ratios, it is not possible to eliminate all O-rings with membranes since this would only create an inflatable volume attached to the tube which would not produce tension in the tube that can be transmitted to the vibrating section of the tube between the clamps and therefore affect its response.

In embodiments where two sets of O rings are used, as shown in FIG. 3, any residual frictional force can be measured and compensated for by the pressure-compensated fluid density estimator 302 using tension measuring devices as described with reference to FIG. 2.

By tuning the force on the tube 301 $F_t$, the pressure dependent terms appearing in the PDE (1) can be reduced, thereby reducing the pressure dependence of equations (2)-(6) derived from the analytical solution thereof. Specifically, the $$(-F_t + P \cdot S_f)\frac{\partial^2 \psi}{\partial t \partial z}$$

term is pressure dependent, where $F_t$ is pressure dependent because the fluid 300 exerts a force on the tube 301 that depends on the pressure P of the fluid 300 (as well as other system parameters). Therefore, we want to eliminate the pressure dependence of this term:

$$\frac{\partial(-F_t + PS_f)}{\partial P} = 0 \tag{22}$$

Referring now to the expression for $F_t$ given in equation (3), and the geometry in FIG. 3, the external force term $F_A$ can be expressed as a sum of frictional forces and force exerted by the piston 333:

$$F_\Delta = P\frac{\pi}{4}(c^2 - a^2 + b^2) + F_{friction} \tag{23}$$

Here, $$P\frac{\pi}{4}(c^2 - a^2 + b^2)$$

is the additional force exerted by the piston 333 on the tube 301 quantified as the pressure P times the difference in cross-sectional area of the cylinder containing the piston 333 and the cross-sectional area of the tube 301. Note the expression for the force takes into account the surfaces onto which the fluid pressure cause an axial force. The sum of these pressure contributions do not result in zero force but rather result in a pressure-dependent tension that can be tailored by the relative sizes of these surfaces. There is therefore a variety of geometries which can produce the same total force on the tube. For example, the OD of the seal at O-rings 353/357 and 355/359 could be larger than the tube, in which case the cross-sectional area to subtract from $$\frac{\pi}{4}c^2$$

would be larger than the one expressed in Equation (15). For the pressures seen in downhole applications, which can be up to 30 ksi, the frictional force is small in comparison to the main force on the tube end due to pressure. Furthermore, its' direction, and hence sign in Equation (15), will vary and can be assumed to be zero on average. Frictional force is neglected in the design phase of the pressure-compensated densitometer, hence with $F_{friction}=0$ in (15) and calculating the derivative per (14) using the full expression for $F_t$ (3), Equation (14) yields:

$$(2v_t - 1)b^2 + \frac{E_t S_t}{E_c S_c}(c^2 - a^2) = 0 \quad (24)$$

By solving for c in equation (16) using standard values for a, b, the densitometer in FIG. 3 can be designed with the piston 333 with a prescribed diameter c such that the measured resonant frequency has a minimized dependence on pressure, as described above.

$$c = \sqrt{a^2 + \frac{E_c S_c}{E_t S_t}b^2(1 - 2v_t)} \quad (25)$$

For example, a densitometer system can have a=0.301", b=0.219", A=1.800", B=0.600", $v_t$=0.342 which results in c=1.010" from equation (16) if $E_t=E_C$. This value for c is a reasonable dimension for practical design considerations.

Once the piston 333 is installed with diameter according to equation (16), the resonance frequency will have a much smaller dependence on pressure, due to the elimination of the $$\left(\underbrace{m_f V^2 - F_t}_{0} + P \cdot S_f\right)\frac{\partial^2 \psi}{\partial z^2}$$

term in Equation (1). The resonant frequency will retain a small dependence on pressure due to the contribution of pressure on the geometry of the vibrating tube, which affects the other terms in Equation (1). With experimentation or numerical simulations, one can further refine the choice of the dimension c to further reduce or eliminate the dependence of the resonance frequency on the applied pressure.

To account for friction, the $F_A$ term of Equation (23) can be better determined using a tension measuring device as described in FIG. 2 above, for example, using a full-Poisson bridge of strain gauges, using the following equation:

$$F_{friction} = \quad (26)$$
$$F_\Delta - P\frac{\pi}{4}(c^2 - a^2 + b^2) = \left(\frac{\varepsilon_B E_t(a^2 - b^2)}{(K_1 - K_2)(1 - v_t)}\right)\frac{\pi}{2} - P\frac{\pi}{4}(c^2 - a^2 + 3b^2)$$

In equation (26), $\varepsilon_B$ is the output strain by the full-Poisson bridge circuit with the strain gauges mounted on the tube 301.

The densitometers depicted in FIGS. 1-3 can be deployed in-line in a PWFT tester, or as a sensor in any LWD system. The measurement modules 102, 202, and 302 can be configured to receive additional measurements of formation properties including fluid bubble point, fluid compressibility, fluid pressure, fluid temperature, fluid viscosity, and fluid thermal conductivity (i.e. changes in all of the above properties).

Any of the densitometer modifications depicted by the example densitometers in FIGS. 1-3 can be used interchangeably. The measurement modules can be configured to calibrate fluid density measurements according to any of the theoretical characterizations given above. For instance, a densitometer can have dissimilar tube and clamp materials, a piston component, and tension measuring devices. Such a system can have minimized temperature and pressure dependence and can use tension measurements to compensate for residual forces acting on the densitometer tube.

Example Densitometer Figures

Figure 4:
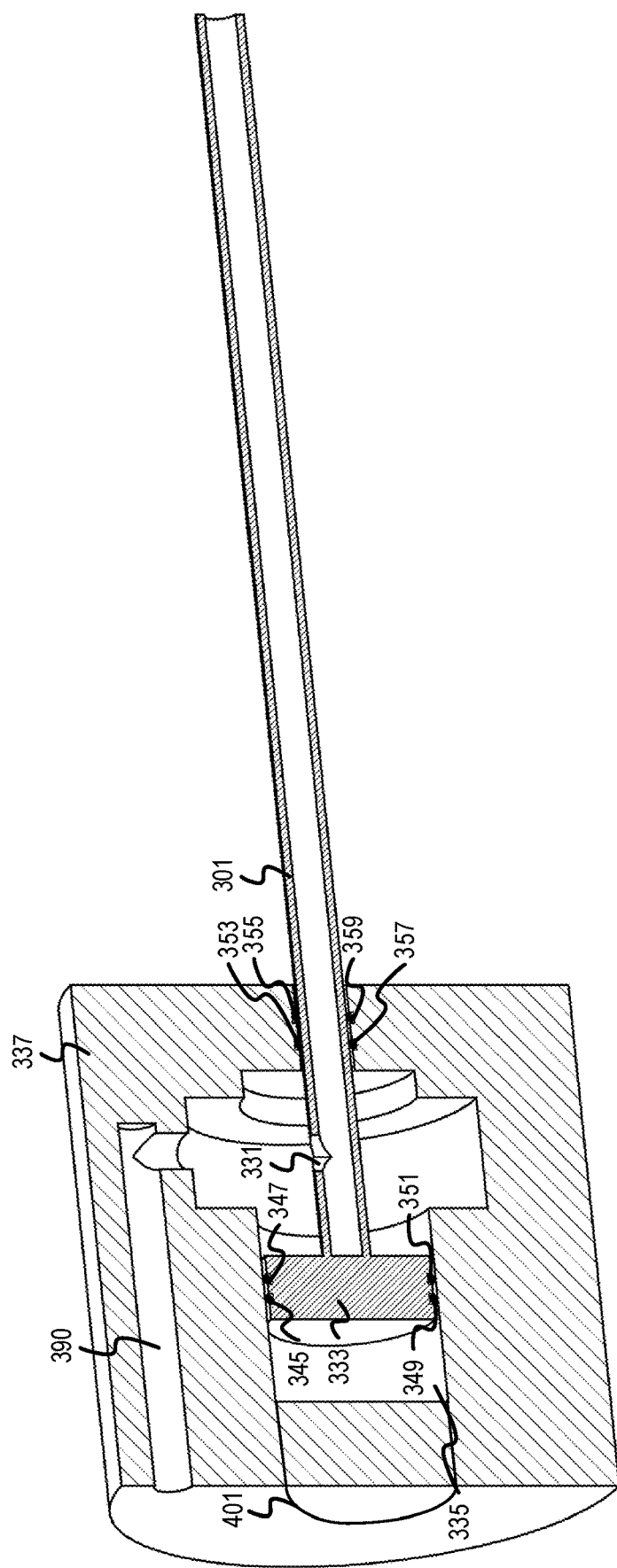
FIG. 4 is an isometric view of a sealed piston at the end of a densitometer tube.

FIG. 4 is an isometric view of a sealed piston at the end of a densitometer tube. A fluid enters the densitometer via a first manifold flow path 309 and continues to a tube 301 via a port 331. The fluid exerts pressure on a piston 333 at the end of the tube 301. The piston 333 is sealed to a manifold 337 with O-rings 345, 347, 349, and 351. A fluid chamber 335 situated behind the piston 333 inside of the manifold 337 collects fluid leakage through the seal of the O-rings 345, 347, 349, and 351. The manifold is sealed to the tube 301 via an additional set of O-rings 353, 355, 357, and 359. The components in FIG. 4 can be part of a densitometer system that is designed to minimize pressure dependence of density estimates of a sample fluid, for example the densitometer in FIG. 3.

Figure 5:
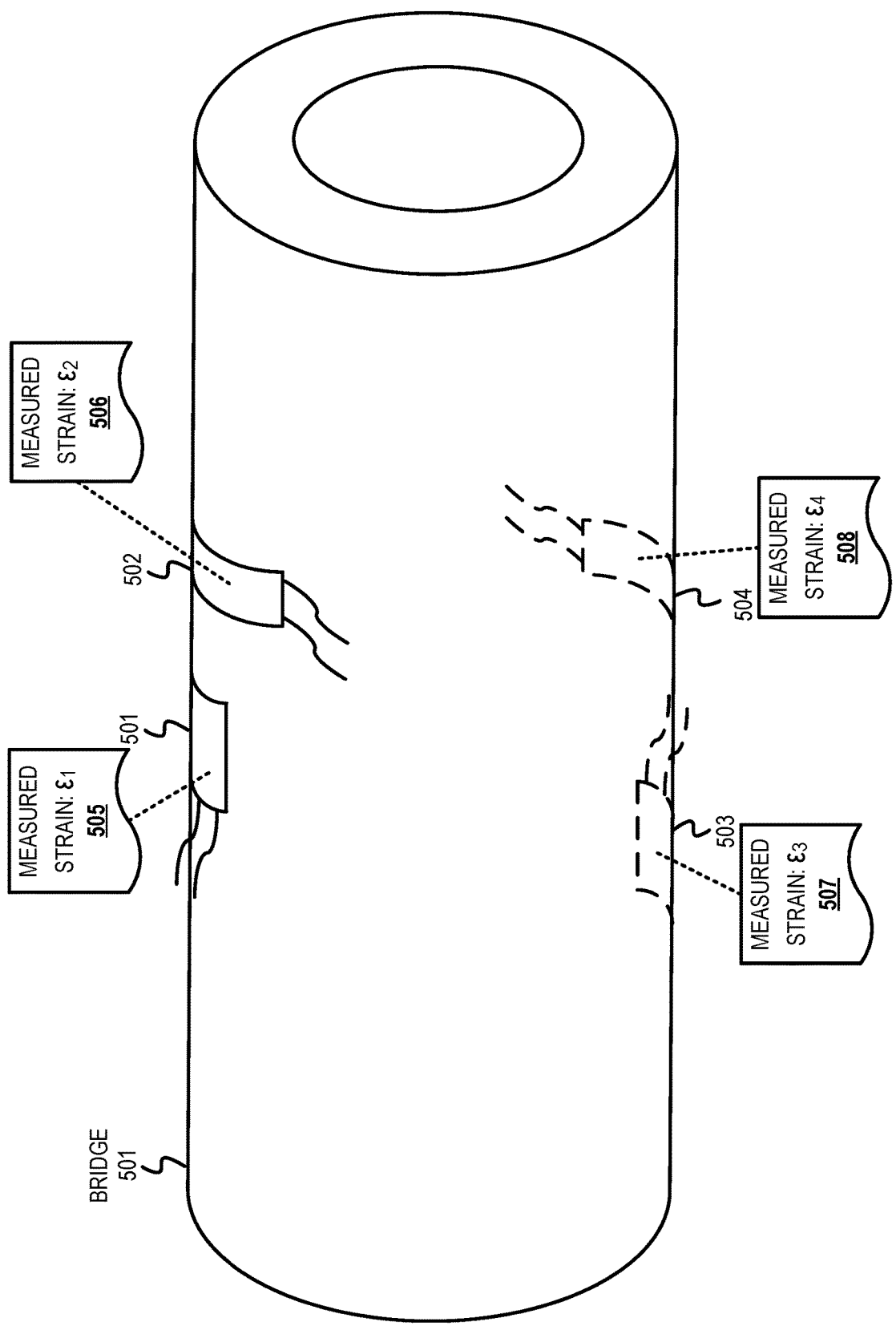
FIG. 5 is a frontal view of four strain gauges affixed to a tube in "axial full Poisson bridge" configuration.

FIG. 5 is a frontal view of four strain gauges affixed to a tube in "axial full Poisson bridge" configuration. Strain gauges 501-504 are attached to the outside of a tube 500 and measure strains $\varepsilon_1$ 505, $\varepsilon_2$ 506, $\varepsilon_3$ 507, and $\varepsilon_4$ 508. Strain gauges 501 and 503 are aligned parallel to the axis of the tube 500 and strain gauges 502 and 504 are aligned perpendicular to the axis of the tube 500. Strain gauges 501 and 502 are on the top of the tube 500 and strain gauges 503 and 504 are on the bottom of the tube 500. This configuration of strain gauges 501-504 is designed to increase accuracy of axial strain measurements along the tube 500 and remove bending and temperature effects. With reference to FIG. 2, the tension measuring device 233 can comprise the strain gauges 501, 502 and the tension measuring device 235 can comprise the strain gauges 503, 504. The tube 500 can be any of the tubes 101, 201, or 301 with reference to FIGS. 1-3. Note that even though temperature and bending effects are removed, effects due to pressure, which causes an increase in the radial dimension, are not removed. This is the reason for a separate pressure measurement that is then used to calculate $F_A$. A similar configuration of strain gauges can be used to measure strain on the clamps 103, 203, 303 of any of the densitometers depicted in FIGS. 1-3 above (e.g., tension measuring device 237 is the combination of strain gauge 501 and 502 and tension measuring device 239 is the combination of strain gauges 503 and 504). When measuring the strain on the clamp, there is no pressure effect but we have a large attenuation effect due to the stiffness of the clamp compared to the tube. The axial strain on the clamp will be:

$$\varepsilon_{clamp} = \frac{F_\Delta}{S_c E_c + S_t E_t} \quad (27)$$

Here too one can use a Full Poisson bridge to determine $\varepsilon_{clamp}$.

$$\varepsilon_B = \frac{(K_1 - K_2)(1 + v_c)}{2}\varepsilon_{clamp} = \frac{(G)((1 + v_c)}{2(1 - v_0 K_T)}\varepsilon_{clamp} \quad (28)$$

Such that $$\varepsilon_{clamp} = \frac{2\varepsilon_B}{(K_1 - K_2)(1 + \nu_c)} = \frac{2(1 - \nu_0 K_T)\varepsilon_B}{G(1 + K_T)(1 + \nu_c)} \quad (29)$$

Figure 6:
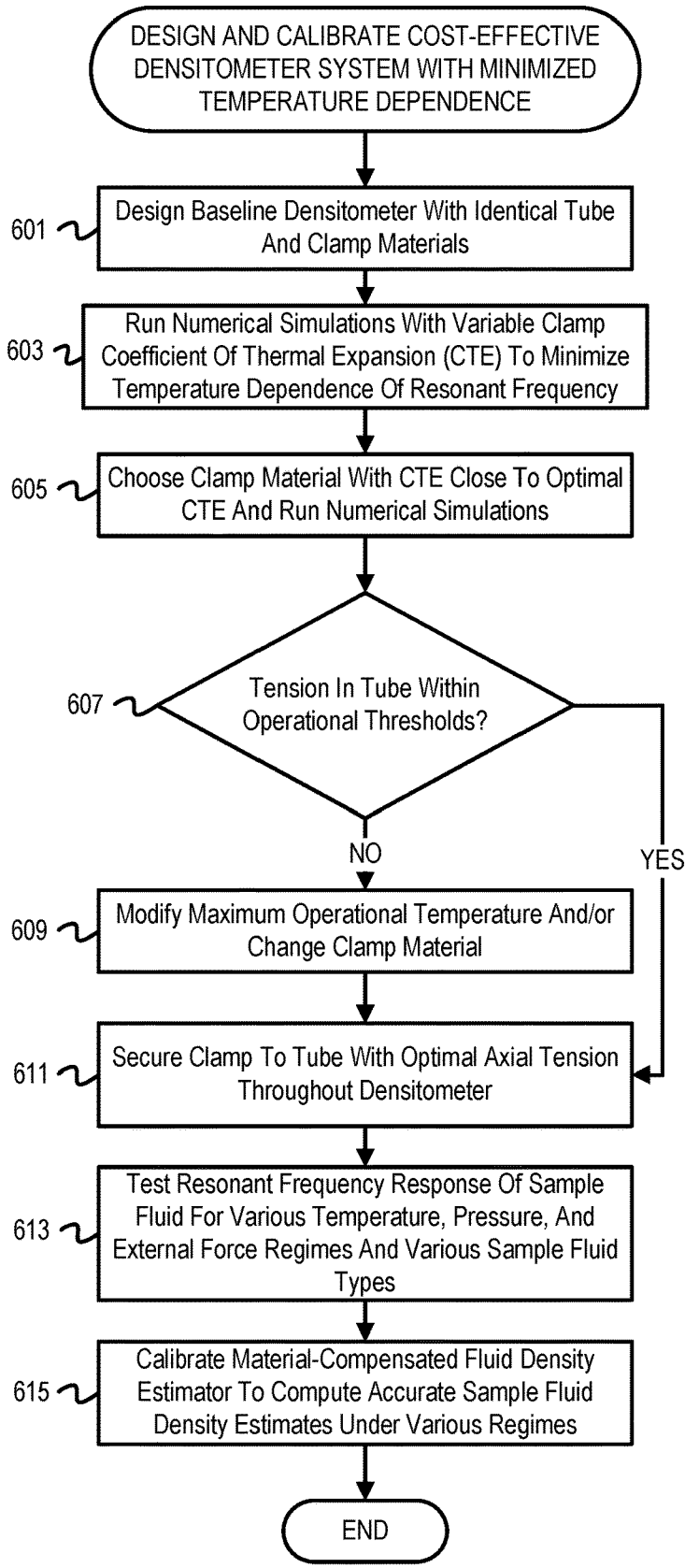
FIG. 6 is a flowchart of example operations for designing and calibrating a densitometer with minimized sensitivity to temperature changes.
Figure 7:
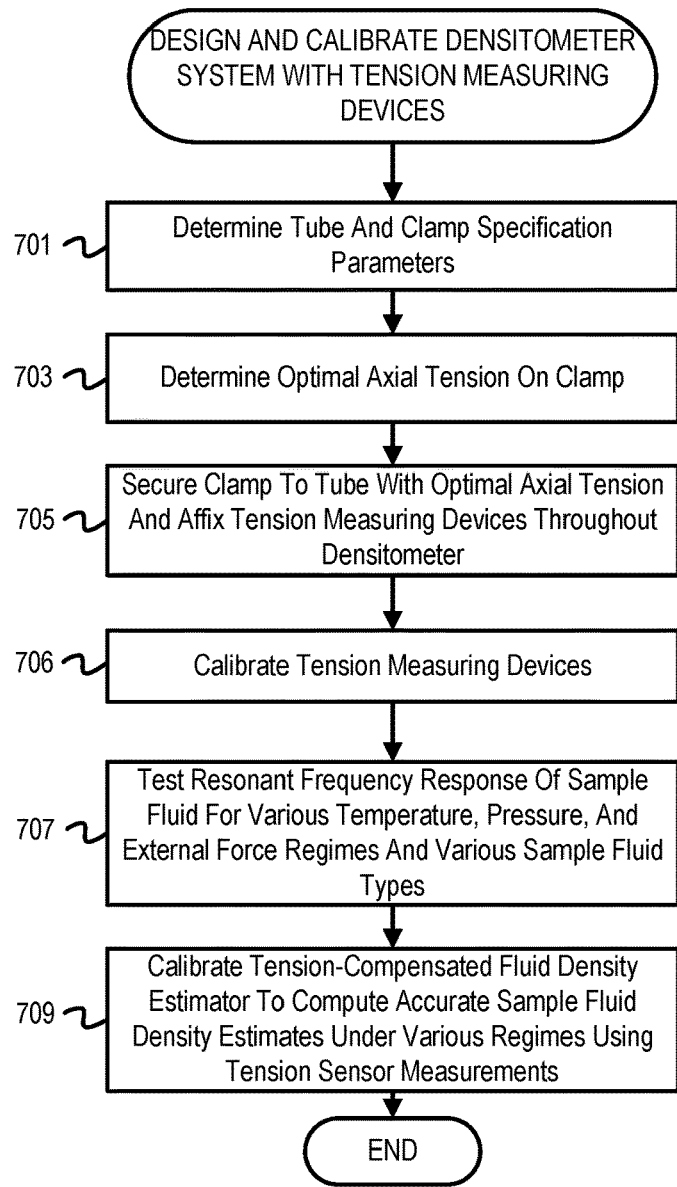
FIG. 7 is a flowchart of example operations for designing and calibrating a densitometer system with tension-measuring devices.
Figure 8:
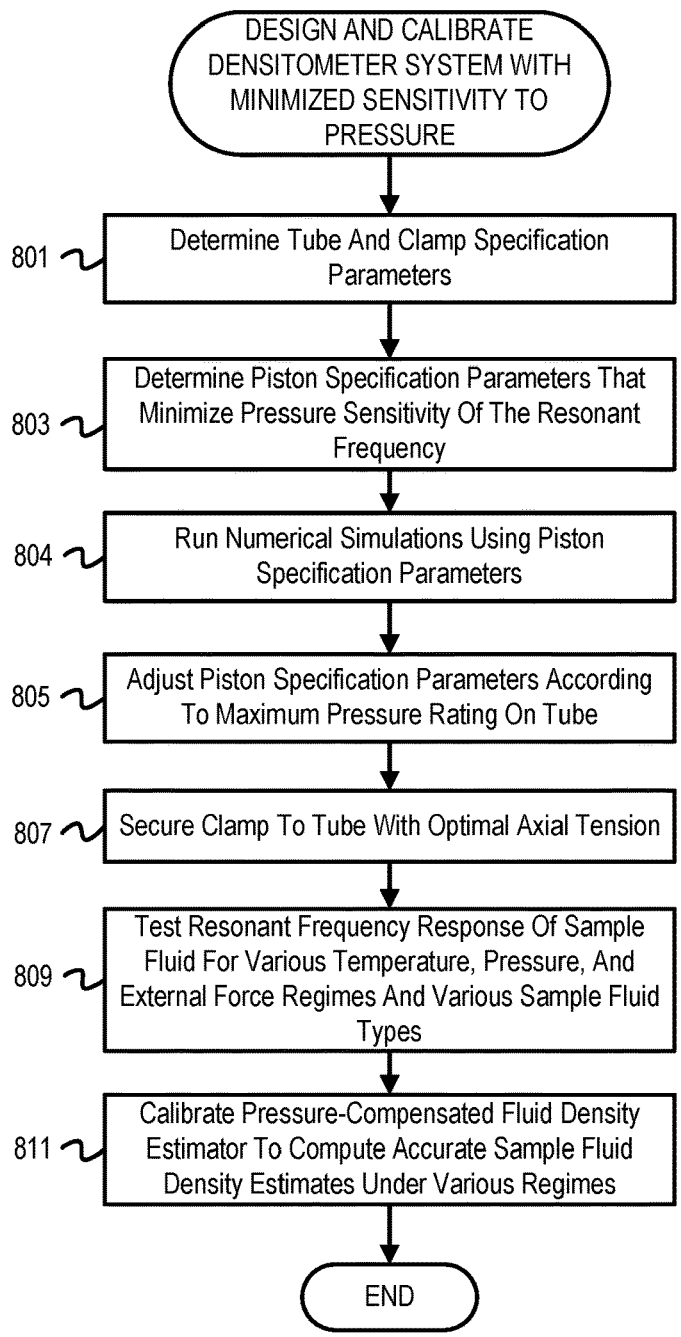
FIG. 8 is a flowchart of example operations for designing and calibrating a densitometer system with minimized sensitivity to pressure.

FIGS. 6-8 refer to a densitometer assembly system in illustrative examples. The operations described in FIGS. 6-8 can be performed by any system configured to assemble, test, and calibrate a densitometer system with temperature, pressure, or tension compensation.

FIG. 6 is a flowchart of example operations for designing and calibrating a cost-effective densitometer system with minimized temperature dependence. Various operations described in FIG. 6 can be applied to the densitometers depicted in FIGS. 1-3 or variations thereof. Sub-operations within each block depicted in FIG. 6 can be used selectively or not at all.

At block 601, a densitometer assembly system designs a baseline densitometer with identical tube and clamp materials. The densitometer assembly system chooses tube, clamp, and housing materials as well as specification parameters. The specification parameters include inner diameter, outer diameter of the tube and the clamp, clamp length, length of the tube section within the housing, length of the vibrating section of the tube (inside the clamp ends), etc. The inner diameter of the tube should be chosen such that fluid flows uninhibited through the deployed densitometer and should depend on the volumetric flow rate of a system in which the densitometer is deployed. Other dimensions should be chosen to be cost effective, to handle loads and pressure/temperature regimes that are typical in the system, and according to any manufacturer specified thresholds on the materials used for the tube and clamp.

At block 603, the densitometer assembly system runs numerical simulations with variable clamp CTEs to minimize temperature dependence of the resonant frequency of the sample fluid in the densitometer system. For example, equation (7) above can be used to determine the temperature dependence of the resonant frequency based on the specification parameters of the densitometer system chosen at block 601.

At block 605, the densitometer assembly system determines a clamp material that is both cost-effective and has a CTE close to the optimal CTE to minimize temperature dependence as determined at block 603. Metallic alloys can be used to achieve a desired CTE at low cost. The densitometer assembly system runs numerical simulations on the densitometer system to verify that the temperature dependence of the resonant frequency is still small. Moreover, the numerical simulations can verify that the required forces on the tube due to temperature, pressure, external forces, and forces applied to the tube and clamp when the densitometer is constructed do not overload the densitometer. These numerical simulations can additionally determine an optimal axial tension to apply to the clamp when securing the clamp to the tube (which will experience an equal and opposite axial compression force). Various factors including the tube and clamp specification parameters, external forces due to environmental factors (e.g., when the densitometer is deployed in a well at significant depth), the tube and clamp materials and the theoretical considerations for tube and clamp materials with different CTEs as given by, for example, equation (7) should be considered.

At block 607, the densitometer assembly system determines whether the tension in the tube is within operational thresholds. This determination can be based on the numerical simulations at block 605. If the tension in the tube is within operational thresholds, operations skip to block 611. Otherwise, operations continue to block 609.

At block 609, the densitometer assembly system modifies the maximum operational temperature and/or changes the clamp material so that the densitometer system is within operational thresholds. For example, the maximum operational temperature can be lowered so that the tension in the tube never exceeds operational limits. Alternatively, a clamp material can be chosen with a material that only reduces temperature dependence of the resonant frequency of the sample fluid in the densitometer system instead of completely eliminating the temperature dependence. In some embodiments, the optimal axial tension to apply to the clamp when securing the clamp to the tube can be modified so that the system is within operational thresholds.

At block 611, the densitometer assembly system constructs the tube and the clamp with the prescribed specification parameters and materials. The densitometer assembly system then secures the clamp to the tube with the optimal axial tension and affixes pressure, temperature, and tension sensors throughout the densitometer. The pressure, temperature, and tension sensors should be placed so as to monitor these physical quantities at locations in the densitometer that are relevant to tuning resonant frequency measurements of the sample fluid in the tube. More or less sensors can be used depending on cost, expected external factors in a deployment environment, etc.

At block 613, the densitometer assembly system tests resonant frequency response of a sample fluid for various temperature, pressure, and external force regimes and various sample fluid types. The range of temperature, pressure, and external forces tested should be in accordance with likely environmental conditions of the densitometer when deployed. In densitometer systems designed to have minimized dependence on temperature, smaller ranges can be used for these parameters and a fewer number of temperature sensors can be affixed to the densitometer at block 611.

At block 615, the densitometer assembly system calibrates a material-compensated fluid density estimator to compute an accurate sample fluid density estimates under various regimes tested at block 613, as well as other temperature, pressure, and external force regimes. The densitometer assembly system configures the material-compensated fluid density estimator in the densitometer to compute sample fluid density according to temperature, pressure, and force measurements from the sensors affixed at block 611 as well as calibrated values of the resonant frequency based on these measurements using the resonant frequency response above. The densitometer can be configured to detect multiple sample fluid types and use different pre-calibrated resonant frequency values according to each sample fluid type.

FIG. 7 is a flowchart of example operations for designing and calibrating a densitometer system with tension-measuring devices. Various operations described in FIG. 7 can be applied to the densitometers depicted in FIGS. 1-3 or variations thereof. Sub-operations within each block depicted in FIG. 7 can be used selectively or not at all.

At block 701 a densitometer assembly system determines tube and clamp specification parameters. The densitometer assembly system can determine these parameters as described in block 601 with reference to FIG. 6. In embodiments where a tube and a clamp of the densitometer system are made of the same material, the tube dimensions and the clamp dimensions can be chosen to reduce costs based on the material.

At block 703, the densitometer assembly system determines an optimal axial tension on the clamp. The densitometer assembly system can determine the optimal axial tension in the clamp as described in block 605 with reference to FIG. 6 and further considering maximum tension thresholds on the densitometer system when including all axial forces on the tube. It is desirable for the vibrating tube to have a high Q, which is an experimentally-determined value defined as the ratio of the resonance frequency (in Hertz) to the spectral distance (in Hertz) between the frequency values on either side of the resonance frequency where the signal is half the value of peak value when the frequency of a drive signal of constant amplitude is traversed. Typically, larger tension in the tube yield higher Q values and the practical considerations entering the discussion of block 605 come to limit the tension. A Q of 300 or above is considered adequate for operation of typical densitometer.

At block 705, the densitometer assembly system constructs the tube and the clamp with the prescribed specification parameters and materials determined at blocks 701 and 703. The densitometer assembly system then secures the clamp to the tube with the optimal axial tension computed at block 705 and affixes tension measuring devices and other pressure and temperature sensors throughout the densitometer. The pressure, temperature, and tension sensors should be placed so as to monitor these physical quantities at locations in the densitometer that are relevant to tuning resonant frequency measurements of the sample fluid in the tube. More or less sensors can be used depending on cost, expected external factors in a deployment environment, etc. The temperature of the densitometer when the densitometer assembly system performs the operation at block 705 should be recorded for subsequent calculations. The tension measuring devices can be affixed to opposite sides of the tube in a tube cavity that experiences vibrations and can have an optimized configuration for measuring axial tension, for example the configuration in FIG. 6. Additional tension measuring devices can be placed throughout the densitometer system to further monitor tension in various components to ensure they do not exceed system thresholds.

At block 706, the densitometer assembly system calibrates the tension measuring devices affixed to the densitometer at block 705. For example, the densitometer calibration system can apply external load cells at various locations of the tension measuring devices throughout the densitometer. Measurements taken at the tension measuring devices can be calibrated against the forces measured by the load cells.

At block 707, the densitometer assembly system tests the resonant frequency response of the sample fluid for various temperature, pressure, and external force regimes and various sample fluid types. The range of temperature, pressure, and external forces tested should be in accordance with likely environmental conditions of the densitometer when deployed.

At block 709, the densitometer assembly system calibrates the tension-compensated fluid density estimator to compute accurate sample fluid density estimates under various regimes tested at block 707. The tension-compensated fluid density estimator can estimate external axial forces on the tube using equations (14) or (21) and can use the external axial force estimates to more accurately estimate resonant frequency of the sample fluid (and therefore estimate sample fluid density) using equation (2).

FIG. 8 is a flowchart of example operations for designing and calibrating a densitometer system with minimized sensitivity to pressure. Various operations described in FIG. 8 can be applied to the densitometers depicted in FIGS. 1-3 or variations thereof. Sub-operations within each block depicted in FIG. 8 can be used selectively or not at all.

At block 801 a densitometer assembly system determines tube and clamp specification parameters. The densitometer assembly system can determine these parameters as described in block 601 with reference to FIG. 6. In embodiments where a tube and a clamp of the densitometer system are made of the same material, the tube dimensions and the clamp dimensions can be chosen to reduce costs based on the material.

At block 803, the densitometer assembly system determines piston specification parameters that minimize pressure sensitivity of the resonant frequency of sample fluid in the densitometer. The piston specification parameters can be chosen so that the pressure sensitivity prescribed by solving for the c parameter in equation (25) is minimized. Additional considerations include cost of the piston material, possible dimensions and corresponding tensions of the piston for the chosen material, etc.

At block 804, the densitometer assembly system runs numerical simulations using the piston simulation parameters determined at block 803. The numerical simulations can incorporate expected operational conditions such as temperature, pressure, and external forces to estimate the net axial load on the densitometer. The axial force in the tube can be computed using equations (3) and (23) based on the pressure, piston specification parameters, and frictional force (i.e. as in equation (26)) exerted on the tube.

At block 805, the densitometer assembly system adjusts piston specification parameters according to the maximum pressure rating on the tube in the densitometer. If the axial load on the tube is above operational thresholds, the densitometer assembly system can adjust the piston specification parameters such as the piston diameter, the piston material, etc. Any of the previous considerations from the operations in the previous Figures can be incorporated such as changing the tube and clamp materials/dimensions, adjust the tension with which the clamp is adhered to the tube, etc. to achieve a densitometer with minimal pressure dependence within operational thresholds.

At block 807, the densitometer assembly system constructs the tube, the clamp, and the piston with the prescribed specification parameters and materials determined at blocks 801 and 805. The densitometer assembly system then secures the clamp to the tube with the optimal axial tension computed which can be computed as described in block 703 with reference to FIG. 7 and affixes pressure, temperature, and tension sensors throughout the densitometer. The pressure, temperature, and tension sensors should be placed so as to monitor these physical quantities at locations in the densitometer that are relevant to tuning resonant frequency measurements of the sample fluid in the tube. More or less sensors can be used depending on cost, expected external factors in a deployment environment, etc. The temperature of the densitometer when the densitometer assembly system performs the operation at block 807 should be recorded for subsequent calculations.

At block 809, the densitometer assembly system tests the resonant frequency response of the sample fluid for various temperature, pressure, and external force regimes and various sample fluid types. The range of temperature, pressure, and external forces tested should be in accordance with likely environmental conditions of the densitometer when deployed.

At block 811, the densitometer assembly system calibrates the pressure-compensated fluid density estimator to compute accurate sample fluid density estimates under various regimes tested at block 809. The pressure-compensated fluid density estimator can approximate all external forces with this frictional force when computing the sample fluid resonant frequency from equation (3) and can calculate frictional forces on the tube using equation (26).

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 601, 603 can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electro-magnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 9:
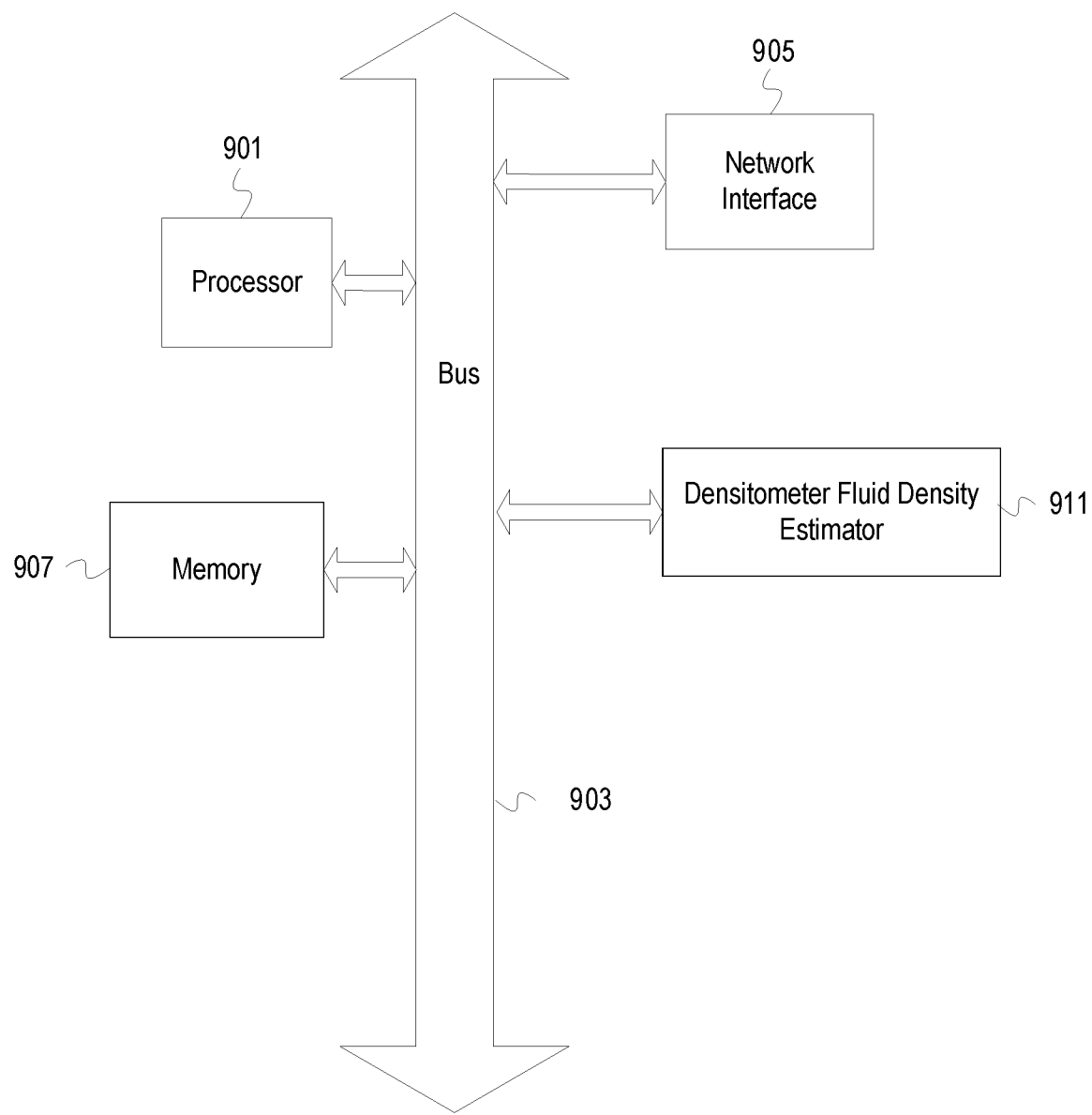
FIG. 9 depicts an example computer system with a densitometer fluid density estimator.

FIG. 9 depicts an example computer system with a densitometer fluid density estimator. The computer system includes a processor unit 901. The computer system includes memory 907. The memory 907 may be system memory or any one or more of the above already described possible realizations of machine-readable media. The computer system also includes a bus 903 and a network interface 905. The system also includes a densitometer fluid density estimator 911. The densitometer fluid density estimator 911 can accurately determine fluid density of fluid inside a densitometer using pressure, temperature, and force measurements such that the temperature dependence and pressure dependence of the densitometer response is minimized and external axial forces on a tube in the densitometer are accurately measurement and compensated for by the densitometer fluid density estimator 911. Any one of the previously described functionalities may be partially (or entirely) implemented in hardware and/or on the processor unit 901. For example, the functionality may be implemented with an application specific integrated circuit, in logic implemented in the processor unit 901, in a co-processor on a peripheral device or card, etc. Further, realizations may include fewer or additional components not illustrated in FIG. 9 (e.g., video cards, audio cards, additional network interfaces, peripheral devices, etc.). The processor unit 901 and the network interface 905 are coupled to the bus 903. Although illustrated as being coupled to the bus 903, the memory 907 may be coupled to the processor unit 901.

While the aspects of the disclosure are described with reference to various implementations and exploitations, it will be understood that these aspects are illustrative and that the scope of the claims is not limited to them. In general, techniques for fluid density measurements from a densitometer with improved accuracy as described herein may be implemented with facilities consistent with any hardware system or hardware systems. Many variations, modifications, additions, and improvements are possible.

Example Drilling Application

Figure 10:
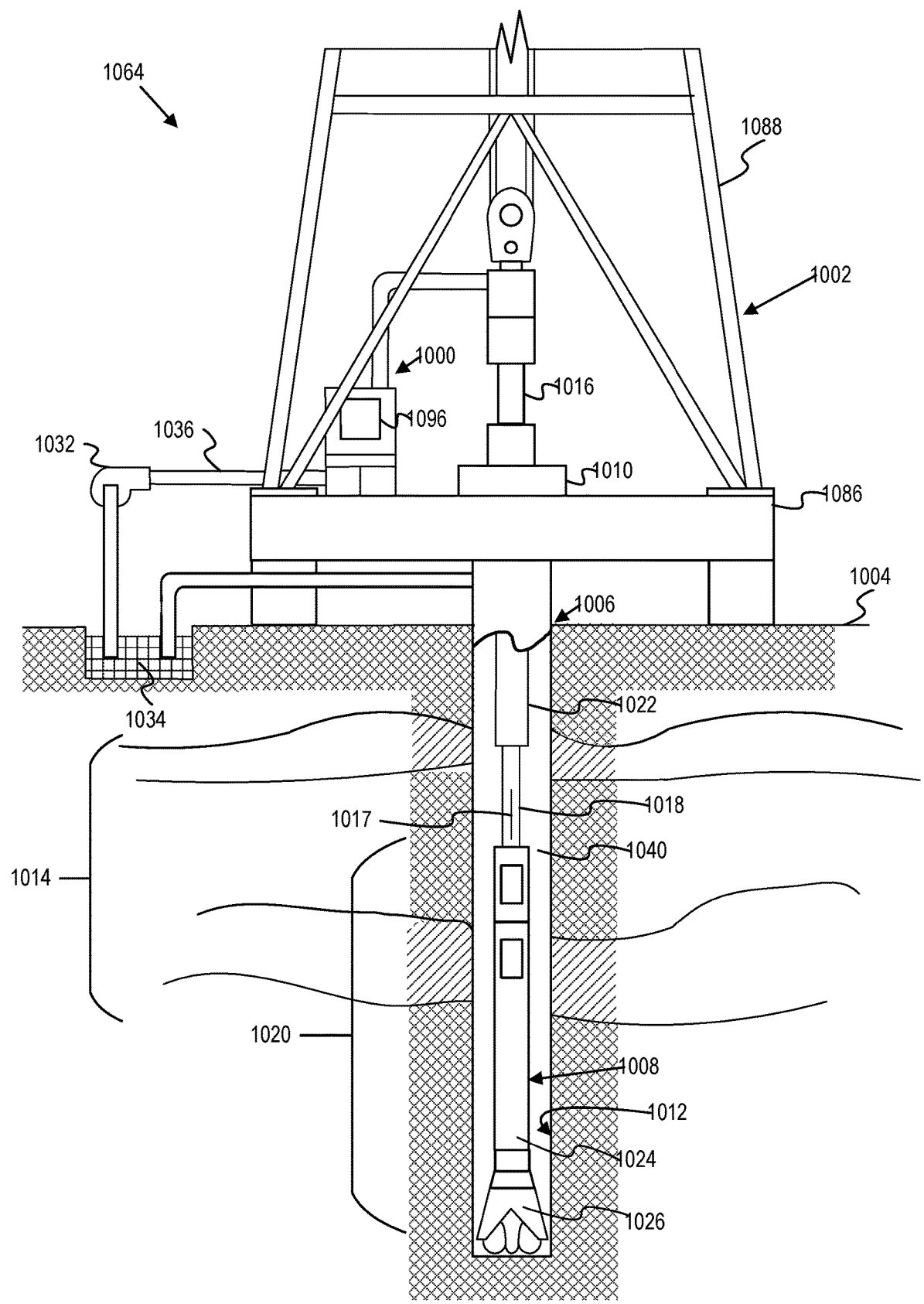
FIG. 10 is a schematic diagram of a drilling rig system with a densitometer.

FIG. 10 is a schematic diagram of a drilling rig system with a densitometer. For example, in FIG. 10 it can be seen how a system 1064 may also form a portion of a drilling rig 1002 located at the surface 1004 of a well 1006. Drilling of oil and gas wells is commonly carried out using a string of drill pipes connected together so as to form a drilling string 1008 that is lowered through a rotary table 1010 into a wellbore or borehole 1012. Here a drilling platform 1086 is equipped with a derrick 1088 that supports a hoist.

The drilling rig 1002 may thus provide support for the drill string 1008. The drill string 1008 may operate to penetrate the rotary table 1010 for drilling the borehole 1012 through subsurface formations 1014. The drill string 1008 may include a kelly 1016, drill pipe 1018, and a bottom hole assembly 1020, perhaps located at the lower portion of the drill pipe 1018.

The bottom hole assembly 1020 may include drill collars 1022, a down hole tool 1024, and a drill bit 1026. The drill bit 1026 may operate to create a borehole 1012 by penetrating the surface 1004 and subsurface formations 1014. The down hole tool 1024 may comprise any of a number of different types of tools including MWD tools, LWD tools, and others.

During drilling operations, the drill string 1008 (perhaps including the kelly 1016, the drill pipe 1018, and the bottom hole assembly 1020) may be rotated by the rotary table 1010. In addition to, or alternatively, the bottom hole assembly 1020 may also be rotated by a motor (e.g., a mud motor) that is located down hole. The drill collars 1022 may be used to add weight to the drill bit 1026. The drill collars 1022 may also operate to stiffen the bottom hole assembly 1020, allowing the bottom hole assembly 1020 to transfer the added weight to the drill bit 1026, and in turn, to assist the drill bit 1026 in penetrating the surface 1004 and subsurface formations 1014.

During drilling operations, a mud pump 1032 may pump drilling fluid (sometimes known by those of ordinary skill in the art as "drilling mud") from a mud pit 1034 through a hose 1036 into the drill pipe 1018 and down to the drill bit 1026. The drilling fluid can flow out from the drill bit 1026 and be returned to the surface 1004 through an annular area 1040 between the drill pipe 1018 and the sides of the borehole 1012. The drilling fluid may then be returned to the mud pit 1034, where such fluid is filtered. In some embodiments, the drilling fluid can be used to cool the drill bit 1026, as well as to provide lubrication for the drill bit 1026 during drilling operations. Additionally, the drilling fluid may be used to remove subsurface formation 1014 cuttings created by operating the drill bit 1026. The drill pipe further comprises a densitometer 1017 configured to receive sample fluid, accurately compute sample fluid density. The densitometer 1017 is communicatively coupled to a logging system 1096 and sends the computed sample fluid density to the logging system 1096. The densitometer 1017 can have minimized temperature and pressure dependence in its' computed sample fluid density and can compensate for external forces using tension measuring devices as described above.

Example Wireline Application

Figure 11:
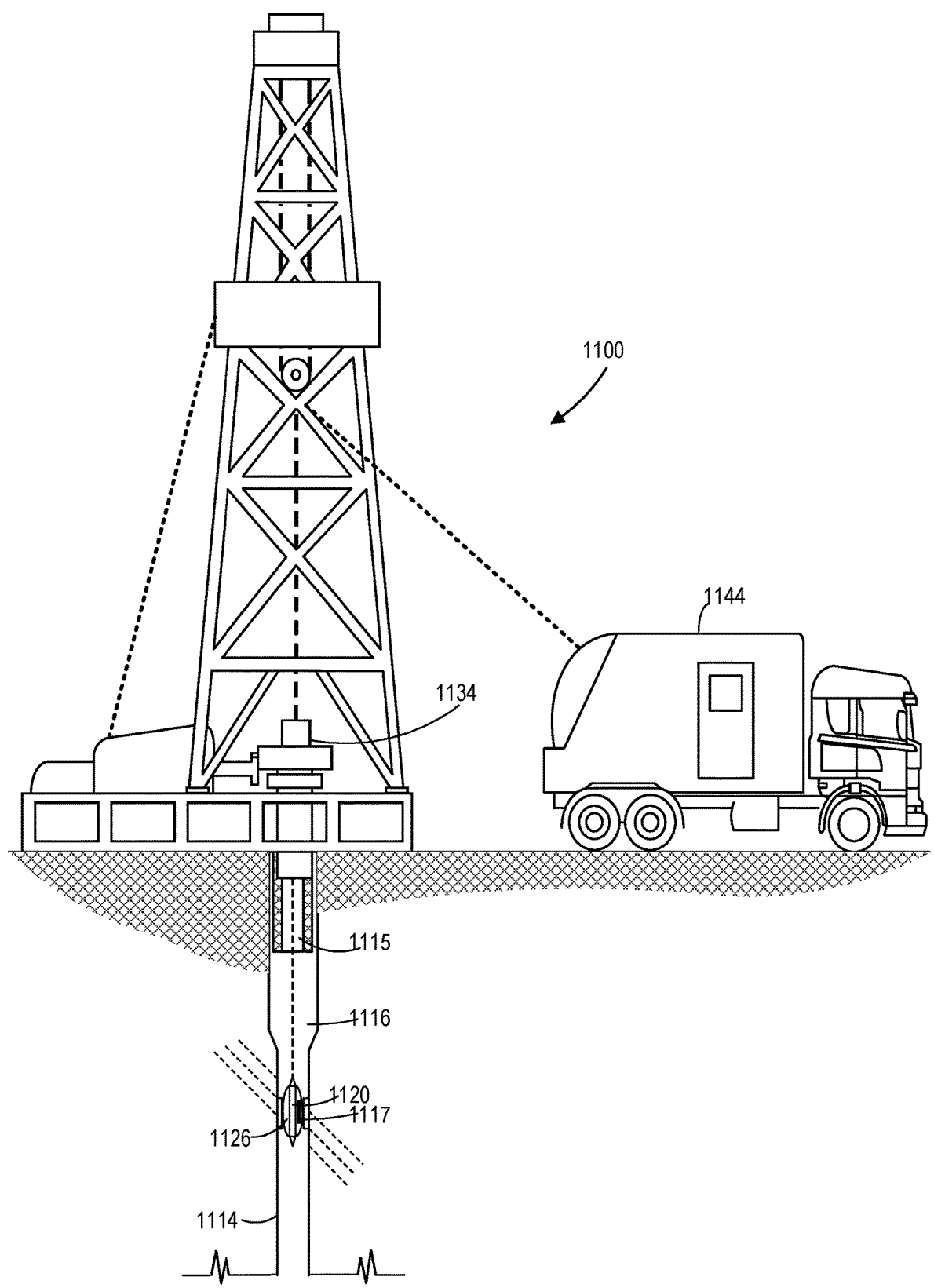
FIG. 11 depicts a schematic diagram of a wireline system with a densitometer.

FIG. 11 depicts a schematic diagram of a wireline system with a densitometer. A system 1100 can be used in an illustrative logging environment with a drillstring removed, in accordance with some embodiments of the present disclosure.

Subterranean operations may be conducted using a wireline system 1120 once the drillstring has been removed, though, at times, some or all of the drillstring may remain in a borehole 1114 during logging with the wireline system 1120. The wireline system 1120 may include one or more logging tools 1126 that may be suspended in the borehole 1114 by a conveyance 1115 (e.g., a cable, slickline, or coiled tubing). The logging tool 1126 may be communicatively coupled to the conveyance 1115. The conveyance 1115 may contain conductors for transporting power to the wireline system 1120 and telemetry from the logging tool 1126 to a logging facility 1144. Alternatively, the conveyance 1115 may lack a conductor, as is often the case using slickline or coiled tubing, and the wireline system 1120 may contain a control unit 1134 that contains memory, one or more batteries, and/or one or more processors for performing operations and storing measurements. The logging tool 1126 further comprises a densitometer 1117 configured to receive sample fluid, accurately compute sample fluid density, and forward the computed sample fluid density to the logging facility 1144. The densitometer 1117 can have minimized temperature and pressure dependence in its' computed sample fluid density and can compensate for external forces using tension measuring devices as described above.

In certain embodiments, the control unit 1134 can be positioned at the surface, in the borehole (e.g., in the conveyance 1115 and/or as part of the logging tool 1126) or both (e.g., a portion of the processing may occur downhole and a portion may occur at the surface). The control unit 1134 may include a control system or a control algorithm. In certain embodiments, a control system, an algorithm, or a set of machine-readable instructions may cause the control unit 1134 to generate and provide an input signal to one or more elements of the logging tool 1126, such as the sensors along the logging tool 1126. The input signal may cause the sensors to be active or to output signals indicative of sensed properties. The logging facility 1144 (shown in FIG. 11 as a truck, although it may be any other structure) may collect measurements from the logging tool 1126, and may include computing facilities for controlling, processing, or storing the measurements gathered by the logging tool 1126. The computing facilities may be communicatively coupled to the logging tool 1126 by way of the conveyance 1115 and may operate similarly to the control unit 1134. In certain example embodiments, the control unit 1134, which may be located in logging tool 1126, may perform one or more functions of the computing facility.

The logging tool 1126 includes a mandrel and a number of extendible arms coupled to the mandrel. One or more pads are coupled to each of the extendible arms. Each of the pads have a surface facing radially outward from the mandrel. Additionally, at least sensor disposed on the surface of each pad. During operation, the extendible arms are extended outwards to a wall of the borehole to extend the surface of the pads outward against the wall of the borehole. The sensors of the pads of each extendible arm can detect image data to create captured images of the formation surrounding the borehole.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Example Densitometer Graphs

FIGS. 12-19 depict example graphs of various measured and intrinsic system and sample fluid properties for densitometer systems. These graphs are intended for illustrative purposes and a real-world densitometer system should additionally compensate for operational conditions such as expected temperature, pressure, and external forces, orientation of the tool, sampling rate, sensor locations, etc. Except where noted otherwise, the pressure inside the densitometer is assumed to be 0 psig in the simulations and a fluid density of 1.000 g/cm³ is assumed in all cases.

Figure 12:
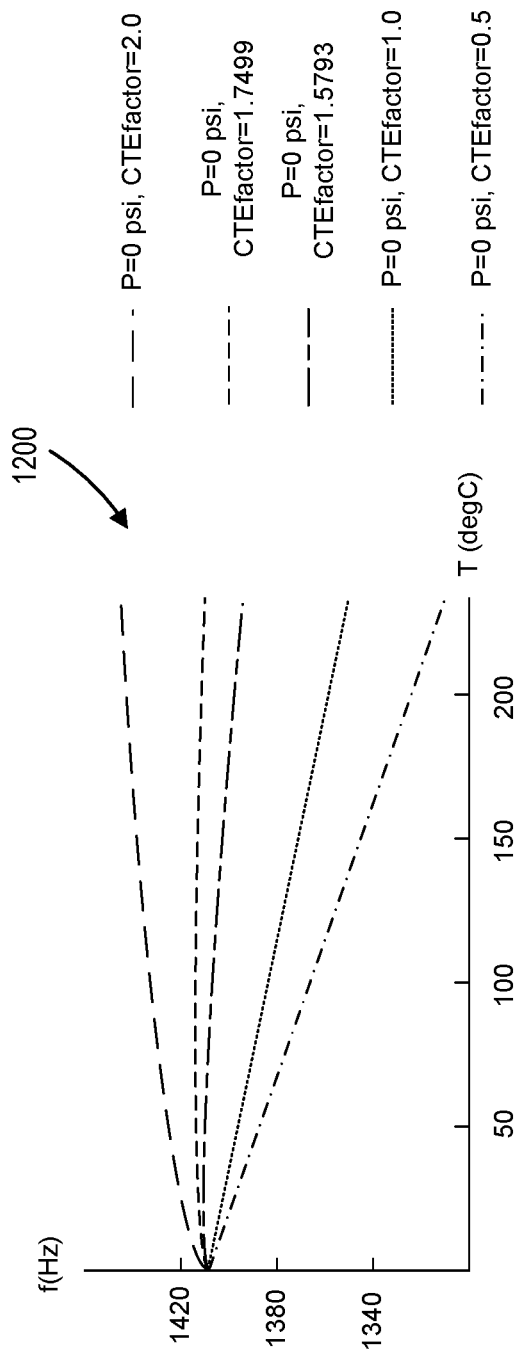
FIG. 12 depicts a graph of resonant frequency of a sample fluid in a densitometer versus temperature for a standard densitometer design and different clamp coefficient of thermal expansion values.

FIG. 12 depicts a graph 1200 of resonant frequency of a sample fluid in a densitometer versus temperature for a standard design of densitometer where the tube and housing of the densitometer are made of titanium alloy (Ti-6AI-4V, grade 5) with a CTE of $9.20 \times 10^{-6}$/°C. To illustrate the design options available, a "CTEfactor" is used as multiplication factor for the value of clamp CTE material relative to the CTE of the tube material. Different plots are shown for CTEfactor=0.5, 1.0, 1.5793, 1.7499, and 2.0. A CTEfactor of 1.0 represents the standard design for which clamp and tube have the same CTE. It can be seen in FIG. 11 that for CTEfactor=1.0, the resonance frequency changes with temperature. With CTEfactor=1.7499, corresponding to a clamp CTE of $16.10 \times 10^{-6}$/° C., the temperature dependence of the resonant frequency is nearly eliminated and represents optimal ratio of CTE to minimize the dependence of the densitometer to temperature. This informs the selection of the clamp material. In some embodiments there is not a real material that is a perfect match for this CTE. In this case, the metal Inconel 706 has an average CTE of $14.53 \times 10^{-6}$/°C in the range 26-200° C. and is close to the desired value, as well as being suitable for this application. This corresponds to the CTEfactor value of 1.5793 also graphed in FIG. 12.

Figure 13:
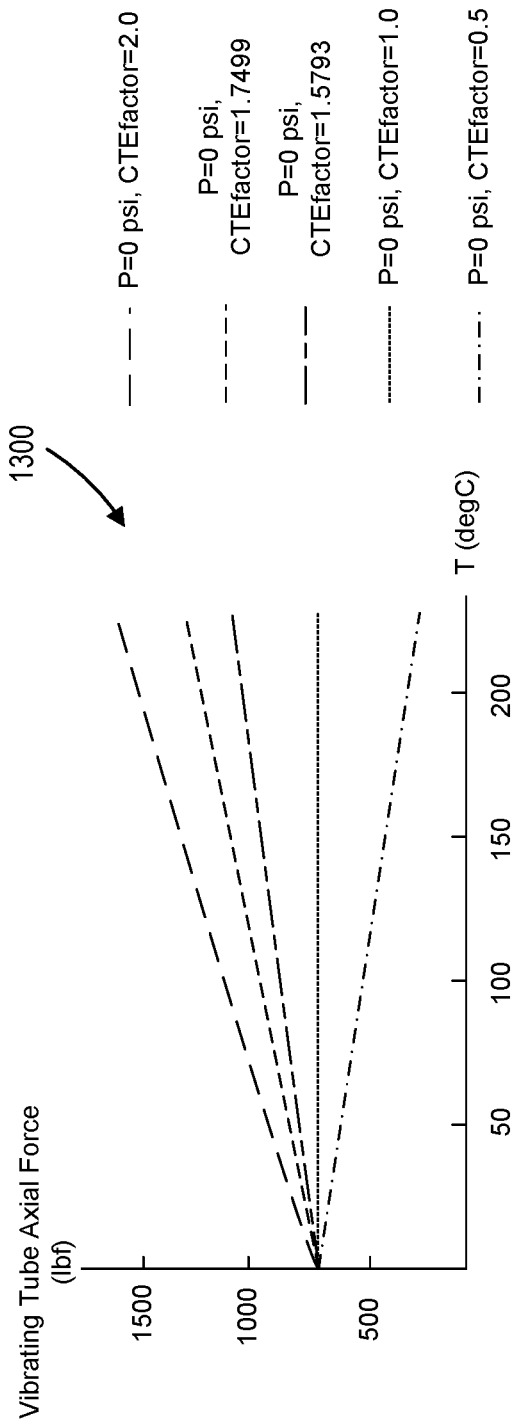
FIG. 13 depicts a graph of axial force on the vibrating tube versus temperature for a standard densitometer design and different clamp coefficient of thermal expansion values.

FIG. 13 depicts a graph 1300 of axial force on the vibrating tube versus temperature. For a CTE of 1.7499, at a deployed temperature of 200° C., the densitometer tube receives a $(16.10-9.20) \times \mu\varepsilon$/° C.$\times(200-25)$ ° C.=1208με temperature-induced axial strain, which may be above the upper limit of tolerable strain for such a densitometer. For a CTEfactor of 1.5793, applicable to the use of Inconel 706 for the clamp, there is a $(14.53-9.20) \times \mu\varepsilon$/° C.$\times(200-25)$° C.=933με temperature-induced axial strain, which is less severe. With this consideration, the upper limit of temperature specification for the tool can be reduced, or a clamp material with an even lower CTEfactor can be chosen such that the temperature-dependence of the densitometer response is not optimal but still smaller than when the same material is used for the clamp as for the tube. Hence, a design can be selected that takes into account both temperature-dependence, and allowable range of temperature.

Figure 14:
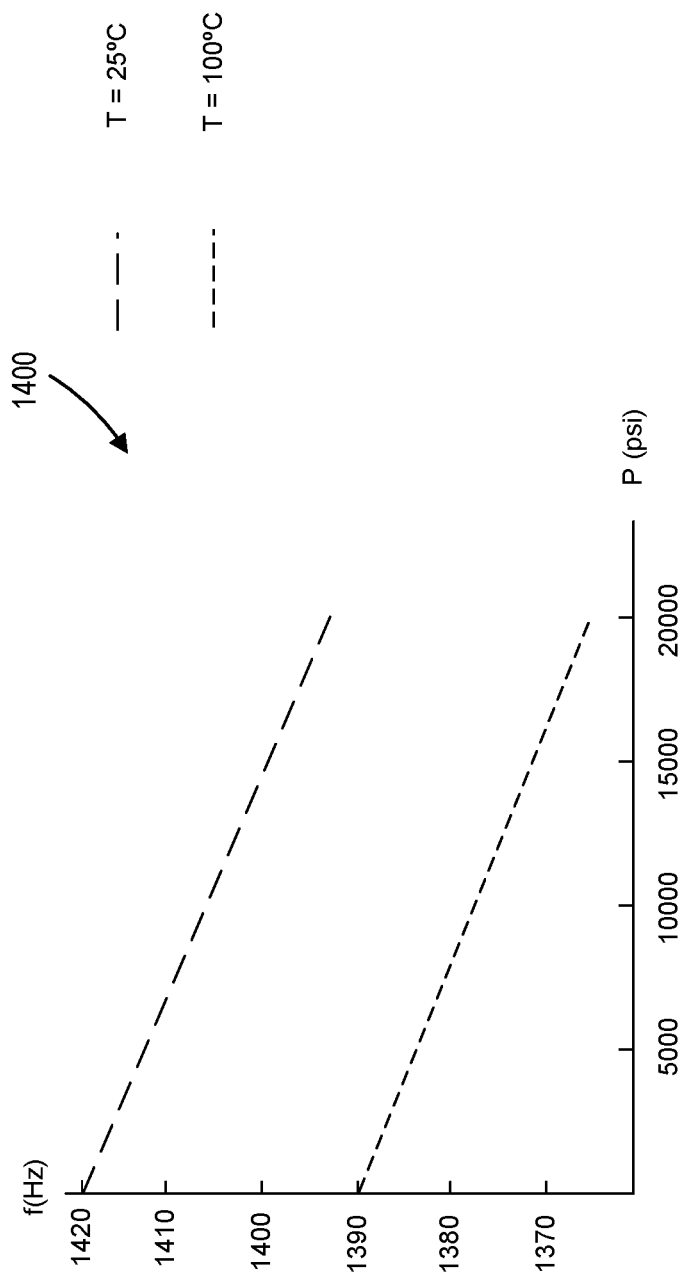
FIG. 14 depicts a graph 1400 of resonant frequency versus pressure for a standard densitometer design.

FIG. 14 depicts a graph 1400 of resonant frequency versus pressure for a standard densitometer design, without the piston of FIGS. 3 and 4, and not optimized for reduced pressure sensitivity. It can be seen that increasing the pressure results in a decrease in the resonant frequency of the vibrating tube.

Figure 15:
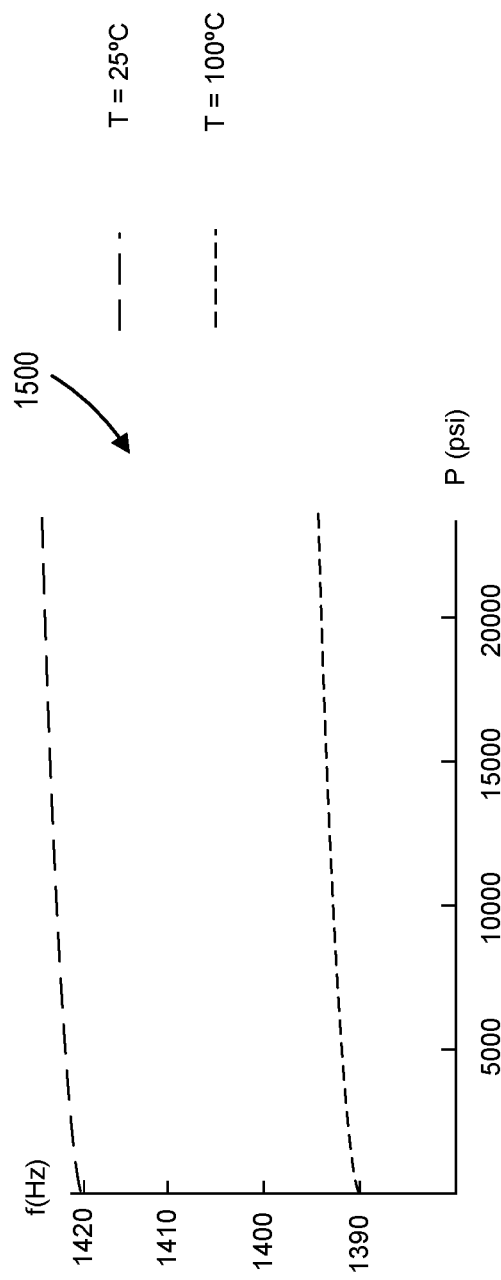
FIG. 15 depicts a graph of resonant frequency versus pressure for a standard design densitometer without a tension-producing piston to compensate for pressure.

FIG. 15 depicts a graph 1500 of resonant frequency versus pressure for a pressure-compensated densitometer with a predetermined piston diameter. The predetermined piston diameter is the value c=1.06507 inches is determined using equation (17). Although pressure dependence is reduced in graph 1300, it is not eliminated. As explained in the description of FIG. 3, this is because Equation (17) only covers the P-dependence brought by the second term of Equation 1, which is dominant but not alone in determining the P-dependence of the frequency response of the vibrating tube. Varying the value of c near the calculated and calculating the slope of the response (slope of the curves such as those in FIG. 14), establishing a relationship between the slope value and the value of c, and then finding, by standard linear regression (or other standard optimization technique) the value of c that minimizes the slope, we find that c=1.003311 inches, in the illustrated case, provides the optimal value to eliminate the pressure-dependence of the design.

Figure 16:
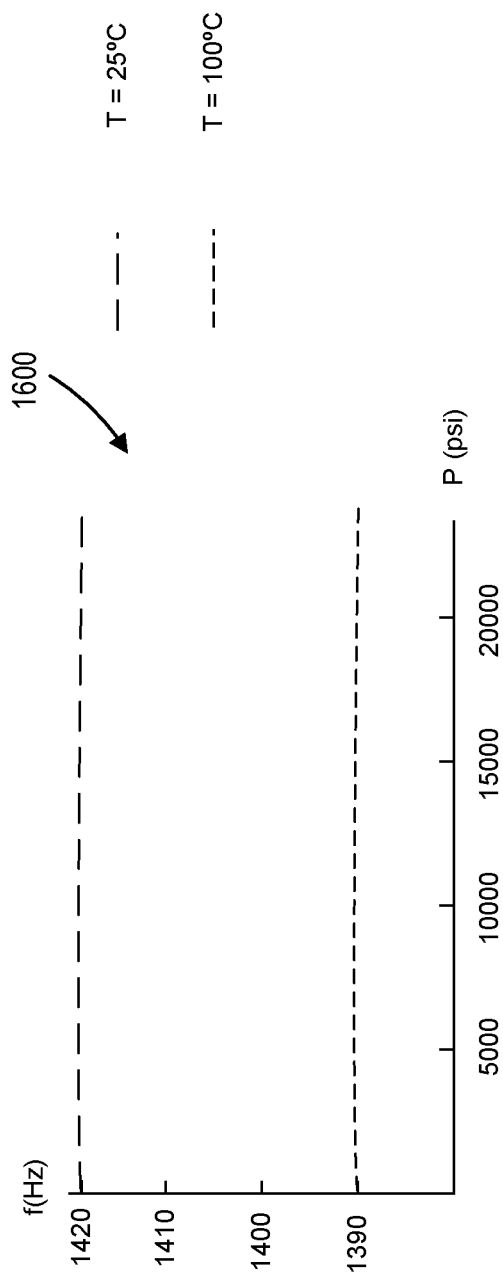
FIG. 16 depicts a graph of resonant frequency versus pressure for a pressure-compensated densitometer with an optimized piston diameter.

FIG. 16 depicts a graph 1600 of pressure versus resonant frequency for a pressure-compensated densitometer with an optimized piston diameter. Varying the value of c calculated with reference to FIG. 15 near the calculated value c=1.06507 inches, and calculating the slope of the response (slope of the curves in FIG. 15), establishing a relationship between the slope value and the value of c, and then finding by standard linear regression (or other standard optimization technique) the value of c that minimizes the slope, the optimal value is c=1.003311 inches and the results are plotted in FIG. 16. The pressure dependence of the densitometer depicted by graph 1600 is nearly eliminated.

Figure 17:
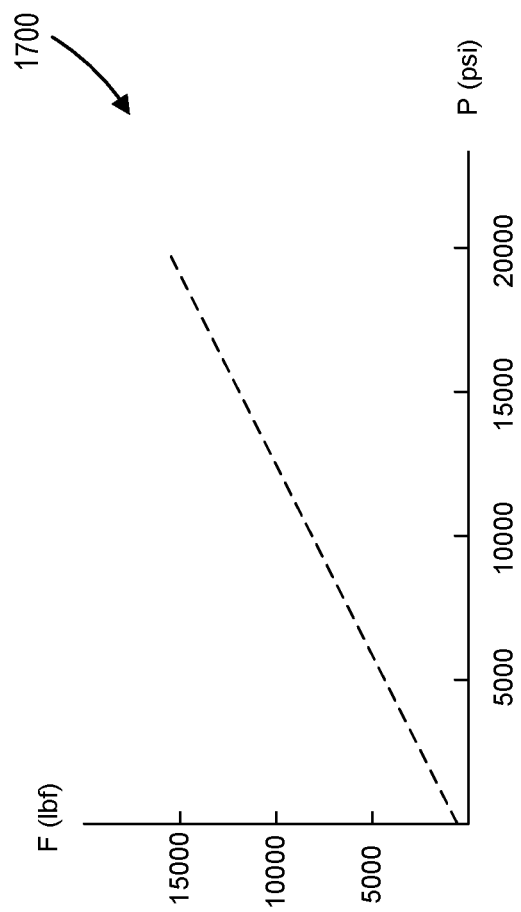
FIG. 17 depicts a graph of net axial force on the tube versus pressure for the densitometer design in FIG. 16.

FIG. 17 depicts a graph 1700 of net axial force on the tube versus pressure for the densitometer design in FIG. 14 (T=25° C. case). FIG. 15 shows the piston has a diameter (i.e. the tube end outer diameter) such that pressure dependence is negligible. Conversely, FIG. 16 shows that the net axial force on the tube quickly increases with increased pressure. Using 4000 lbf as a typical design threshold, we see that this is exceeded when P reaches about 5000 psi. Such large tensions are needed in this case because this tension is acting on the sections of tube external to the clamp, whereas it is the tension of the tube section (of length L) between the two clamp ends that affect the resonance frequency of the tube. Only a small fraction of the external force is transferred to the vibrating tube, and this is due to the rigidity of the clamp body compared to that of the tube in cross-sections in the region of length L between the clamps. This axial force is a serious design consideration for densitometer systems. In this case it would limit the pressure rating to 5000 psi, which is too small for most downhole applications, where a pressure rating of 20000 psi or above is typically needed.

Figure 18:
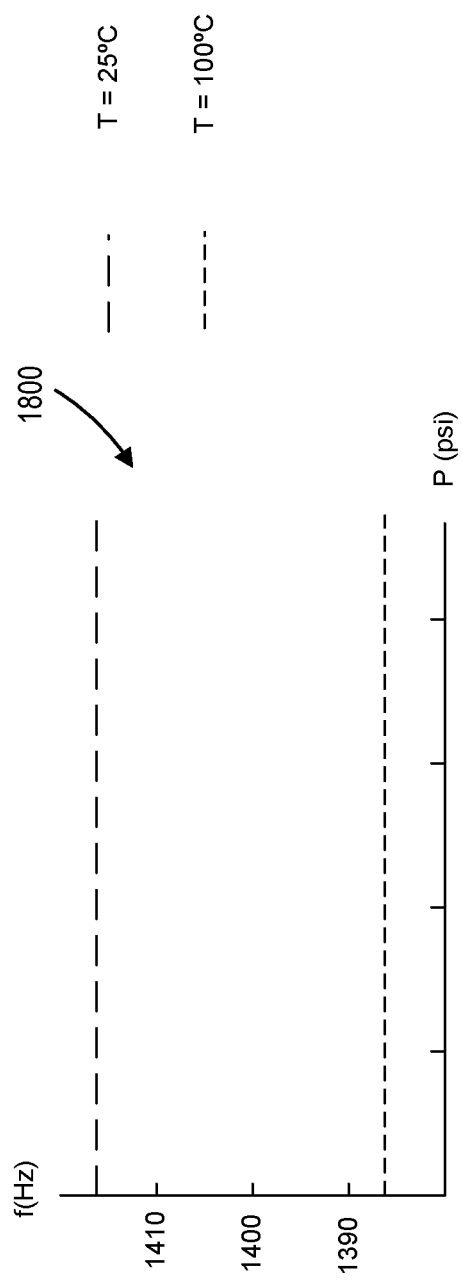
FIG. 18 depicts a graph of resonant frequency versus pressure for a revised pressure compensated densitometer.

FIG. 18 depicts a graph 1800 of resonant frequency versus pressure for a revised pressure compensated densitometer. Here the densitometer has a tube with an outer diameter 0.301", an inner diameter 0.220", a tube material Ti-6AI-4V grade 5 alloy, the same as for the design in FIGS. 15 and 16. However, the clamp OD is now decreased reduced from 1.800" to 1.000". In this case, the optimal value of c=0.550896 inches is determined using the same procedure with reference to FIGS. 15 and 16. FIG. 18 shows the tube resonance frequency vs. pressure for these new dimensions and we see that the response is flat with pressure for both T=25° C. and T=100° C.

Figure 19:
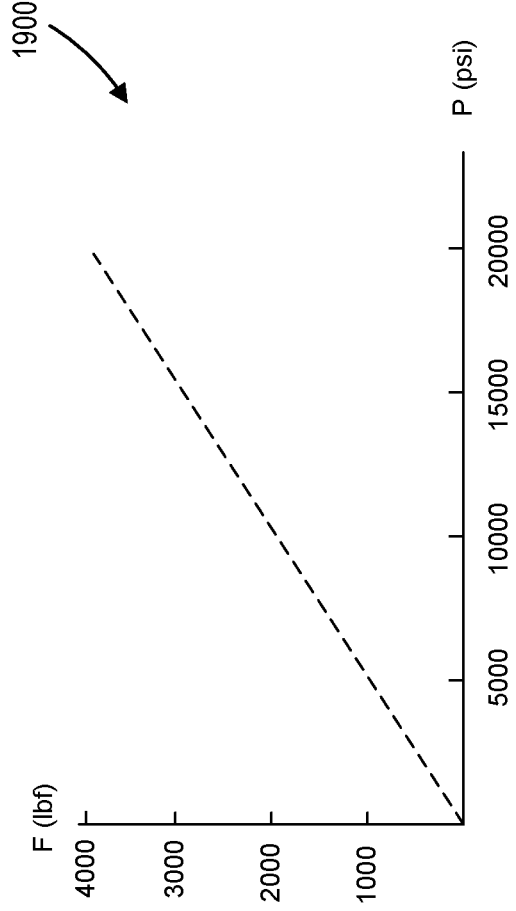
FIG. 19 depicts a graph of net axial force on the tube versus pressure for the densitometer design in FIG. 18.

FIG. 19 depicts a graph 1900 of net axial force on the tube versus pressure for the densitometer design in FIG. 18. The graph 1900 shows that the change to a smaller OD for the clamp results in a much smaller force on the external tube being needed to cause the same pressure-dependence-removing axial force on the vibrating tube. The resulting design has a pressure rating of 20000 psi.

As used herein, the term "or" is inclusive unless otherwise explicitly noted. Thus, the phrase "at least one of A, B, or C" is satisfied by any element from the set {A, B, C} or any combination thereof, including multiples of any element.

What is claimed is:

1. A method comprising:
    inducing, with a vibration source attached to a tube of a densitometer, a vibration in the tube which contains a sample fluid;
    detecting, from a vibration detector attached to the tube, an indication of the vibration in the tube; and
    determining an estimate $\rho_f$ of a fluid density of the sample fluid in the tube based, at least in part, on the vibration indication, a plurality of measurements received from one or more sensors attached to the densitometer and a plurality of tension measurements received from one or more tension measuring devices attached to the densitometer,
    wherein an inner tube section of the tube is held within a clamp that extends along the inner tube section of the tube for a length L of the tube,
    wherein the vibration source and the vibration detector are attached to the inner tube section of the tube, and
    wherein the tube extends beyond each of the ends of the clamp along a longitudinal axis of the tube to form sections of the tube outside of the clamp, and wherein at least one of the one or more tension measuring devices are attached to the tube in the sections of the tube outside of the clamp.

2. The method of claim 1, wherein determining the estimate $\rho_f$ of the fluid density of the sample fluid in the tube comprises determining estimate $\rho_f$ of the fluid density of the sample fluid in the tube based, at least in part, on predetermined sample fluid resonant frequency values at a controlled temperature value for the densitometer, a controlled pressure value for the sample fluid, and a controlled external force value on the tube.

3. The method of claim 1, wherein the plurality of measurements comprises at least one of temperature measurements or pressure measurements.

4. The method of claim 1, further comprising attaching all the tension measuring devices to the tube.

5. The method of claim 4, further comprising arranging the one or more tension measuring devices in a Wheatstone bridge on the tube.

6. The method of claim 1, wherein the sample fluid density estimate $\rho_f$ in the tube is determined in accordance with $$f_0 = \frac{\beta_0^2}{2\pi L^2}\sqrt{\frac{E_t I}{m_t + \rho_f S_f}},$$

wherein $f_0$ is a resonant frequency of the vibration in the tube, $\beta_0$ is a coefficient that depends on the plurality of measurements, the plurality of tension measurements, and material properties of the densitometer, $E_t$ is a Young's modulus of a material of the tube, $m_t$ is a mass per unit length of the tube, $S_f$ is a cross sectional area of the sample fluid in the tube, I is an area moment of inertia of the tube, and L is a length of the tube.

7. The method of claim 6, further comprising adjusting the values for $E_t$, L, $S_f$, and $\beta_0$ based on an external force on the tube, wherein the external force on the tube is determined in accordance with $$F_\Delta = \left(\frac{\varepsilon_B E_t(a^2 - b^2)}{(K_1 - K_2)(1 - v_t)} - Pb^2\right)\frac{\pi}{2},$$

wherein $F_\Delta$ is the external force on the tube, $\varepsilon_B$ is a measured strain along the axis of the tube, a is an outer diameter of the tube, b is an inner diameter of the tube, P is a pressure in the tube, $K_1$ is determined in accordance with $$K_1 = \frac{G}{1 - v_0 K_t},$$

$K_2$ is determined in accordance with $K = K_t K_1$, G is a gauge factor for the one or more tension measuring devices, $K_t$ is a transverse sensitivity factor for the one or more tension measuring devices, $v_t$ is a Poisson's ratio for the material of the tube, and $v_0$ is a Poisson's ratio of a reference sample.

8. A non-transitory machine-readable medium having program code for estimating fluid density of a fluid, the program code comprising program code to:
    control a vibration source to induce a vibration in a tube of a densitometer;
    receive an indication of vibration detected by a vibration detector attached to the tube at a different location than the vibration source;
    calculate an estimate $\rho_f$ of a fluid density of a fluid in the tube, wherein the program code to calculate the fluid density estimate comprises program code to,
        input the vibration indication, a plurality of measurements received from a one or more sensors attached to the densitometer and a plurality of tension measurements received from one or more tension measuring devices attached to the densitometer into a calibrated fluid density model; and
        generate, from the calibrated fluid density model, the estimate $\rho_f$ of the fluid density of the fluid in the tube,
    wherein an inner tube section of the tube is held within a clamp that extends along the inner tube section of the tube for a length L of the tube,
    wherein the vibration source and the vibration detector are attached to the inner tube section of the tube, and
    wherein the tube extends beyond each of the ends of the clamp along a longitudinal axis of the tube to form sections of the tube outside of the clamp, and wherein at least one of the one or more tension measuring devices are attached to the tube in the sections of the tube outside of the clamp.

9. The machine-readable medium of claim 8, wherein the program code to generate, from the calibrated fluid density model, the estimate $\rho_f$ of the fluid density of the fluid in the tube comprises program code to generate the sample fluid density estimate $\rho_f$ based, at least in part, on predetermined sample fluid resonant frequency values at a controlled temperature value for the densitometer, a controlled pressure value for the sample fluid, and a controlled external force value on the tube.

10. The machine-readable medium of claim 8, wherein the plurality of measurements comprises at least one of temperature measurements or pressure measurements.

11. The machine-readable medium of claim 8, wherein all the tension measuring devices are attached to the tube.

12. The machine-readable medium of claim 8, wherein the program code to generate, from the calibrated fluid density model, the estimate $\rho_f$ of the fluid density of the fluid in the tube comprises program code to generate, from the calibrated fluid density model, the estimate $\rho_f$ of the fluid density of the fluid in the tube in accordance with $$f_0 = \frac{\beta_0^2}{2\pi L^2} \sqrt{\frac{E_t I}{m_t + \rho_f S_f}},$$

wherein $f_0$ is a resonant frequency of the vibration in the tube, $\beta_0$ is a coefficient that depends on the first material properties, the second material properties, and the plurality of measurements, $E_t$ is a Young's modulus of the first material, $m_t$ is a mass per unit length of the tube, $S_f$ is a cross sectional area of the sample fluid in the tube, I is an area moment of inertia of the tube, and L is a length of the tube.

13. The machine-readable medium of claim 12, wherein the program code to generate, from the calibrated fluid density model, the estimate $\rho_f$ of the fluid density of the fluid in the tube comprises program code to adjust values for $E_t$, L, $S_f$, and $\beta_0$ based on an external force on the tube, wherein the external force on the tube is in accordance with $$F_\Delta = \left( \frac{\varepsilon_B E_t (a^2 - b^2)}{(K_1 - K_2)(1 - v_t)} - Pb^2 \right) \frac{\pi}{2},$$

wherein $F_\Delta$ is the external force on the tube, $\varepsilon_B$ is a measured strain along the axis of the tube, a is an outer diameter of the tube, b is an inner diameter of the tube, P is a pressure in the tube, $$K_1 = \frac{G}{1 - v_0 K_t},$$

$K_2 = K_t K_1$, G is a gauge factor for the one or more tension measuring devices, $K_t$ is a transverse sensitivity factor for the one or more tension measuring devices, $v_t$ is a Poisson's ratio for the material of the tube, and $v_0$ is a Poisson's ratio of a reference sample.

14. An apparatus comprising:
   a tube that receives a sample fluid;
   a clamp encompassing the tube;
   a vibration source attached to the tube;
   a vibration detector attached to the tube;
   one or more sensors attached to the apparatus;
   one or more tension measuring devices attached to the tube,
      wherein an inner tube section of the tube is held within a clamp that extends along the inner tube section of the tube for a length L of the tube,
      wherein the vibration source and the vibration detector are attached to the inner tube section of the tube, and
      wherein the tube extends beyond each of the ends of the clamp along a longitudinal axis of the tube to form sections of the tube outside of the clamp, and wherein at least one of the one or more tension measuring devices are attached to the tube in the sections of the tube outside of the clamp; and
   a computing device coupled to control the vibration source to induce a vibration in the tube and coupled to the vibration detector to receive an indication of the vibration in the tube detected by the vibration detector, the computing device programmed to determine an estimate $\rho_f$ of a fluid density of the sample fluid in the tube based, at least in part, on a plurality of tension measurements received from the one or more tension measuring devices, and a plurality of measurements received from the one or more sensors attached to the apparatus.

15. The apparatus of claim 14, wherein the computing device comprises a machine-readable medium having stored therein program code to determine the sample fluid density estimate $\rho_f$ in the tube in accordance with $$f_0 = \frac{\beta_0^2}{2\pi L^2} \sqrt{\frac{E_t I}{m_t + \rho_f S_f}},$$

wherein $f_0$ is a resonant frequency of the vibration in the tube, $\beta_0$ is a coefficient that depends on the first material properties, the second material properties, and the plurality of measurements, $E_t$ is a Young's modulus of the first material, $m_t$ is a mass per unit length of the tube, $S_f$ is a cross sectional area of the sample fluid in the tube, I is an area moment of inertia of the tube, and L is a length of the tube.

16. The apparatus of claim 15, wherein the computing device comprises a machine-readable medium having stored therein program code to adjust values for $E_t$, L, $S_f$, and $\beta_0$ based on an external force on the tube, wherein the external force on the tube is in accordance with $$F_\Delta = \left( \frac{\varepsilon_B E_t (a^2 - b^2)}{(K_1 - K_2)(1 - v_t)} - Pb^2 \right) \frac{\pi}{2},$$

wherein $F_\Delta$ is the external force on the tube, $\varepsilon_B$ is a measured strain along the axis of the tube, a is an outer diameter of the tube, b is an inner diameter of the tube, P is a pressure in the tube, $$K_1 = \frac{G}{1 - v_0 K_t},$$

$K_2 = K_t K_1$, G is a gauge factor for the one or more tension measuring devices, $K_t$ is a transverse sensitivity factor for the one or more tension measuring devices, $v_t$ is a Poisson's ratio for the material of the tube, and $v_0$ is a Poisson's ratio of a reference sample.

17. The apparatus of claim 14, wherein the computing device is calibrated to determine the estimate $\rho_f$ of the fluid density of the fluid in the tube based, at least in part, on predetermined sample fluid resonant frequency values at a controlled temperature value for the tube and the clamp, a controlled pressure value for the sample fluid, and a controlled external force value on the tube.

18. The apparatus of claim 14, wherein the plurality of measurements comprises at least one of temperature measurements or pressure measurements.

19. The apparatus of claim 14, wherein all the tension measuring devices are attached to the tube.

20. The apparatus of claim 19, wherein the one or more tension measuring devices are arranged in a Wheatstone bridge configuration on the tube.

* * * * *